(12) United States Patent
Okada et al.

(10) Patent No.: US 8,420,854 B2
(45) Date of Patent: Apr. 16, 2013

(54) DI(METH)ACRYLATE COMPOUND, POLYMERIZABLE LIQUID CRYSTAL COMPOSITION, OPTICAL ANISOTROPIC MATERIAL, OPTICAL ELEMENT AND OPTICAL INFORMATION WRITING/READING DEVICE

(75) Inventors: Satoshi Okada, Koriyama (JP); Makoto Hasegawa, Tokyo (JP); Hiroshi Kumai, Koriyama (JP); Hiromichi Nagayama, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/344,186

(22) Filed: Jan. 5, 2012

(65) Prior Publication Data

US 2012/0123074 A1    May 17, 2012

Related U.S. Application Data

(63) Continuation of application No. PCT/JP2010/061490, filed on Jul. 6, 2010.

(30) Foreign Application Priority Data

Jul. 8, 2009   (JP) ................................ 2009-161367
Jun. 28, 2010  (JP) ................................ 2010-146738

(51) Int. Cl.
| | |
|---|---|
| *C07C 69/54* | (2006.01) |
| *C07C 69/73* | (2006.01) |
| *C08F 20/30* | (2006.01) |
| *C09K 19/38* | (2006.01) |
| *G02F 1/13* | (2006.01) |
| *G11B 7/135* | (2012.01) |

(52) U.S. Cl.
USPC ........................................... 560/220; 560/116

(58) Field of Classification Search .................. None
See application file for complete search history.

(56) References Cited

U.S. PATENT DOCUMENTS

| 4,739,112 A | 4/1988 | Savu |
| 5,723,066 A | 3/1998 | Coates et al. |
| 6,613,245 B1 | 9/2003 | Ohlemacher et al. |
| 2011/0069241 A1 | 3/2011 | Okada et al. |
| 2011/0089372 A1 | 4/2011 | Okada et al. |

FOREIGN PATENT DOCUMENTS

| JP | 57-130929 | 8/1982 |
| JP | 61-218537 | 9/1986 |
| JP | 06-507987 | 9/1994 |
| JP | 2001-002619 | 1/2001 |
| JP | 2002-521354 | 7/2002 |
| JP | 2004-263037 | 9/2004 |

OTHER PUBLICATIONS

U.S. Appl. No. 13/446,117, filed Apr. 13, 2012, Okada, et al.
International Search Report issued Aug. 10, 2010 in PCT/JP2010/061490 filed Jul. 6, 2010.
Wolfgang Sucrow, et al.; "Some Novel Liquid Crystalline Perhydro-6-cyclohexyl-naphthalenol Derivatives"; Academic Bulletin, Chimia, 1982, vol. 36, pp. 460-462.

*Primary Examiner* — Yevegeny Valenrod
(74) *Attorney, Agent, or Firm* — Oblon, Spivak, McClelland, Maier & Neustadt, L.L.P.

(57) ABSTRACT

The present invention provides an optical anisotropic material having a good light stability, and provides a di(meth)acrylate compound represented by the following formula (1) and a polymerizable liquid crystalline composition that are suitable for the production of the optical anisotropic material. Further, the present invention provides an optical element having a good light stability and an optical information writing/reading device using the same.

17 Claims, 9 Drawing Sheets

DI(METH)ACRYLATE COMPOUND, POLYMERIZABLE LIQUID CRYSTAL COMPOSITION, OPTICAL ANISOTROPIC MATERIAL, OPTICAL ELEMENT AND OPTICAL INFORMATION WRITING/READING DEVICE

TECHNICAL FIELD

The present invention relates to a di(meth)acrylate compound, a polymerizable liquid crystalline composition, an optical anisotropic material, an optical element, and an optical information writing/reading device.

BACKGROUND ART

On a surface of an optical disk such as a CD (compact disk) or a DVD (digital versatile disk), concaves and convexes called as pits are provided. An optical head device is a device for irradiating an optical disk with a laser beam and detecting light reflected from the disk to read information recorded in the pits.

For example, linearly polarized light emitted from a light source is transmitted through a beam splitter, a collimator lens, a retardation plate, and an objective lens to reach an information-recording plane of an optical disk. The linearly polarized light in the outgoing path is straightly transmitted through the beam splitter and transformed into circularly polarized light by the retardation plate. The circularly polarized light is reflected by the information-recording plane of the optical disk to be circularly polarized light in the reverse roll, and is then transmitted through the objective lens, the retardation plate, and the collimator lens in this order in the returning path in the reverse order to that of the outgoing path. The light is transformed by the retardation plate in the returning path into linearly polarized light polarized in a direction orthogonal to that before incidence. Accordingly, the light in the returning path, in which the linearly polarized light direction is 90° different from that of the light in the outgoing path, is shifted its traveling direction by 90° when the light passes through the beam splitter, and reaches a photodetector.

In the optical head device, if face deflection or the like occurs in the optical disk when reading or writing information, the focal position of a beam spot deviates from the recording surface. Accordingly, a servo mechanism for detecting such a deviation and shifting to make the beam spot follow the concave/convex pits on the recording surface is required. Such a mechanism is configured to adjust the focus of the beam spot emitted from a laser light source on the recording surface to detect a tracking position, and to make the beam spot follow an objective track. Moreover, in the optical head device, it is necessary to prevent a laser beam reflected by the recording surface without hitting the pits from directly returning to the light source.

For these reasons, the optical head device requires an optical element for modulating (polarizing, diffracting, phase-adjusting, etc.) the laser beam from the light source. For example, the above retardation plate has a function of imparting different refractive index to incident light depending on the angle between the optical axis of the retardation plate and the phase plane of the incident light, and shifting the phases of the two components of light produced by birefringence. The two light components having phases shifted from each other are synthesized when the light is output from the retardation plate. The magnitude of the shift of the phase is determined by the thickness of the retardation plate. Accordingly, by adjusting the thickness, a quarter wavelength plate for shifting the phase by $\pi/2$, a half wavelength plate for shifting the phase by $\pi$, etc. are produced. For example, linearly polarized light passed through a quarter wavelength plate becomes circularly polarized light, and linearly polarized light passed through a half wavelength plate becomes linearly polarized light having a polarization plane tilted by 90°. By utilizing such a characteristic and combining a plurality of optical elements, the above servo mechanism can be constructed. Moreover, the above optical element is employed also for preventing a laser beam reflected by the recording surface without hitting pits from directly returning to the light source.

The above optical element can be produced by employing a liquid crystal material. For example, a liquid crystal molecule having a polymerizable functional group has both of a characteristic of polymerizable monomer and a characteristic of liquid crystal. Accordingly, when such liquid crystal molecules each having a polymerizable functional group are aligned and then polymerized, an optical anisotropic material in which alignment of the liquid crystal molecules are fixed can be obtained. Since such an optical anisotropic material has an optical anisotropy such as a refractive index anisotropy derived from a mesogenic structure, by utilizing this characteristic, a diffraction element or a retardation plate is produced. As such an optical anisotropic material, for example, Patent Document 1 discloses an optical anisotropic material obtained by polymerizing a liquid crystalline composition containing a compound represented by $CH_2=CH-COO-Ph-OCO-Cy-Z$ (Z: alkyl group).

BACKGROUND ART DOCUMENT

Patent Document

Patent Document 1: JP-A-2004-263037

SUMMARY OF THE INVENTION

Problems that the Invention is to Solve

By the way, the above optical element is generally preferred to have the following characteristics.

1) The optical element has an appropriate retardation value (Rd value) depending on wavelength to be used and application of the element.

2) Optical characteristics (Rd value, transmittance, etc.) are uniform in the entire surface of the optical element.

3) There is little scattering or absorption at the wavelength to be used.

4) Optical characteristics of the optical element can be easily adjusted to those of other materials constituting the element.

5) Wavelength dispersion of the refractive index or the refractive index anisotropy is small at the wavelength to be used.

Particularly, it is important to have an appropriate Rd value indicated in item 1). Here, the Rd value is a value defined by a relation $Rd=\Delta n \times d$ using a refractive index anisotropy ($\Delta n$) and the thickness (d) in the traveling direction of light. In order to obtain a desired Rd value, if $\Delta n$ of a liquid crystal material forming the optical element is small, it is necessary to increase the thickness d. However, if the thickness d increases, it becomes difficult to align the liquid crystal molecules, so that it becomes difficult to obtain a desired optical characteristic. On the other hand, if $\Delta n$ is large, it is necessary to decrease the thickness d, and in this case, it becomes difficult to precisely control the thickness. Accordingly, it is extremely important for such a liquid crystal material to have an appropriate Δn value.

In recent years, in order to increase the capacity of optical disks, reducing the concave/convex pit size on the optical disk has been in progress by shortening the wavelength of laser beam used for writing or reading information. For example, a laser beam having a wavelength of 780 nm is used for CDs, a laser beam having a wavelength of 650 nm is used for DVDs, and a laser beam having a wavelength of 405 nm is used for BDs (Blue ray Disk). In next-generation recording media, it is expected that still shorter wavelength may be used, and use of a laser beam (hereinafter it is also referred to as blue laser beam) having a wavelength of 300 to 450 nm tends to increase more and more from now on. However, the optical anisotropic material described in Patent Document 1 is insufficient in the durability against a blue laser beam.

For example, when a retardation plate prepared by employing a liquid crystal is disposed in an optical head device using a blue laser beam as a light source, there occurs generation of aberration, decrease of the transmittance, or change of the Rd value with the passage of time in some cases. This is considered to be because the material constituting the retardation plate is damaged by exposure to the blue laser beam. If such an aberration is generated, light (light flux) emitted from the light source and transmitted through a collimator lens and a retardation plate cannot be focused into a point when it passes through an objective lens and reaches a surface of a recording medium. As a result, light utilization efficiency decreases and therefore, efficiency of reading or writing of information decreases. Moreover, when the transmittance decreases, the intensity of light reaching the surface of the recording medium or photodetector becomes low, and therefore, in the same manner as above, the efficiency of reading or writing of information decreases. Furthermore, when the Rd value changes, for example, in a wavelength plate, it is not possible to maintain a desired ellipticity or the extinction ratio of linearly polarized light. As a result, the optical device may not function as an optical head device.

By the way, in order to reduce the size and increase the efficiency of an optical element, a material having a high refractive index anisotropy is usually required. In general, a material having a high refractive index anisotropy has a high refractive index. However, since a high refractive index material has a large wavelength dispersion of refractive index, such a material tends to have a high absorption of short wavelength light (that is, such a material has a high molar absorbance coefficient). Accordingly, conventional high refractive index materials have a problem that they have low durability against short wavelength light such as a blue laser beam.

In order to improve light stability, it is preferred to decrease the molar absorbance coefficient of the material and, for example, a compound having a structure containing no aromatic ring, such as a completely alicyclic structure, may be considered. However, a completely alicyclic liquid crystal monomer usually has a small Δn, and there are problems that a polymer obtained from such a monomer has a further small Δn or such a polymer becomes isotropic, whereby it becomes difficult to obtain a desired liquid crystallinity.

For example, the following two completely alicyclic liquid crystal monomers exhibit optical anisotropy (birefringence), but form isotropic polymers by polymerization.

For this reason, it is necessary to be mixed with another compound to form an anisotropic polymer. However, since the temperature range in which the above monomers show optical anisotropy is not wide, it is difficult to form a composition having a desired liquid crystallinity even if each of the monomers is mixed with another compound.

The present invention has been made considering the above problems. Namely, for an optical element for modulating a laser beam having an wavelength of 300 nm to 450 nm, an optical anisotropic material which shows little degradation even if it is exposed to light in this wavelength band and excellent in the durability, and which is also excellent in liquid crystallinity is required. For such an optical anisotropic material, a composition of a polymerizable liquid crystalline composition that is a constitutional starting material for producing the material by polymerization becomes important. Further, a structure of a compound constituting the polymerizable liquid crystalline composition becomes extremely important. Under the circumstances, an object of the present invention is to provide a di(meth)acrylate compound having a good light stability against a blue laser beam and capable of constituting a desirable polymerizable liquid crystalline composition singly or together with another compound after polymerization, and to provide a polymerizable liquid crystalline composition containing the di(meth)acrylate compound.

Moreover, another object of the present invention is to provide an optical anisotropic material having a good light stability against a blue laser beam.

Furthermore, another object of the present invention is to provide an optical element having a good light stability against a blue laser beam and an optical information writing/reading device employing the same.

Other objects and merits of the present invention will be clarified from the following descriptions.

Means for Solving the Problems

The first embodiment of the present invention relates to a di(meth)acrylate compound represented by the following formula (1):

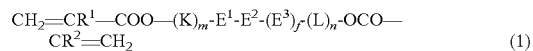  (1)

wherein $R^1$ and $R^2$ are each independently a hydrogen atom or a methyl group, m and n are each independently 0 or 1, K is $-(CH_2)_p COO-$, $-(CH_2)_p OCO-$, $-(CH_2)_p O-$, or $-(CH_2)_p-$ (where each p is independently an integer of 1 to 8), wherein an ethereal oxygen atom may be present in a carbon to carbon bond and some or all of hydrogen atoms may be each substituted by a fluorine atom, L is $-OCO(CH_2)_q-$, $-COO(CH_2)_q-$, $-O(CH_2)_q-$, or $-(CH_2)_q-$ (where each q is independently an integer of 1 to 8), wherein an ethereal oxygen atom may be present in a carbon to carbon bond and some or all of hydrogen atoms may be each substituted by a fluorine atom, $E^1$ and $E^2$ are each independently a trans-1,4-cyclohexylene group or a trans-2,6-decahydronaphthalene group and either one of $E^1$ and $E^2$ is a trans-2,6-decahydronaphthalene group (where, in the trans-1,4-cyclohexylene group and trans-2,6-decahydronaphthalene group in $E^1$ and $E^2$, some or all of hydrogen atoms bonded to carbon atoms in these groups may be each substituted by a fluorine atom or a methyl group), $E^3$ is a trans-1,4-cyclohexylene group or a 1,4-phenylene group (where, in the trans-1,4-cyclohexylene group and 1,4-phenylene group in $E^3$, some or all of hydrogen atoms bonded to carbon atoms in these groups may be each substituted by a fluorine atom or a methyl group), and f is 0 or 1.

In the first embodiment of the present invention, it is preferred that, in the formula (1), $E^1$ is a trans-2,6-decahydronaphthalene group and $E^2$ is a trans-1,4-cyclohexylene group.

In the first embodiment of the present invention, it is preferred that, in the formula (1), K is —(CH$_2$)$_p$COO— or —(CH$_2$)$_p$— (where each p is independently an integer of 1 to 8), an ethereal oxygen atom may be present in a carbon to carbon bond, and some or all of hydrogen atoms may be each substituted by a fluorine atom.

In the first embodiment of the present invention, it is preferred that, in the formula (1), f is 0.

The second embodiment of the present invention relates to a polymerizable liquid crystalline composition, which contains the di(meth)acrylate compound according to the first embodiment of the present invention.

The polymerizable liquid crystalline composition according to the second embodiment of the present invention may be a polymerizable cholesteric liquid crystalline composition containing a polymerizable chiral material.

The third embodiment of the present invention relates to an optical anisotropic material comprising a polymer of the polymerizable liquid crystalline composition according to the second embodiment of the present invention.

The fourth embodiment of the present invention relates to an optical element having the optical anisotropic material according to the third embodiment of the present invention.

The fifth embodiment of the present invention relates to an optical information writing/reading device for writing information on an optical recording medium and/or reading information recorded on an optical recording medium, which has the optical element according to the fourth embodiment of the present invention.

Effects of the Invention

The first embodiment of the present invention provides a di(meth)acrylate compound suitable for constituting a polymerizable liquid crystalline composition having a good light stability against a blue laser beam and exhibiting a desired liquid crystallinity after polymerization and, as a result, suitable for obtaining an optical anisotropic material having a good light stability against a blue laser beam.

The second embodiment of the present invention provides a polymerizable liquid crystalline composition having a good light stability against a blue laser beam and exhibiting a desirable liquid crystallinity after polymerization and, as a result, suitable for obtaining an optical anisotropic material having a good light stability against a blue laser beam.

The third embodiment of the present invention provides an optical anisotropic material having a good light stability against a blue laser beam.

The fourth embodiment of the present invention provides an optical element having a good light stability against a blue laser beam.

The fifth embodiment of the present invention provides an optical information writing/reading device suitable for increasing capacity.

MODE FOR CARRYING OUT THE INVENTION

Figure 1:
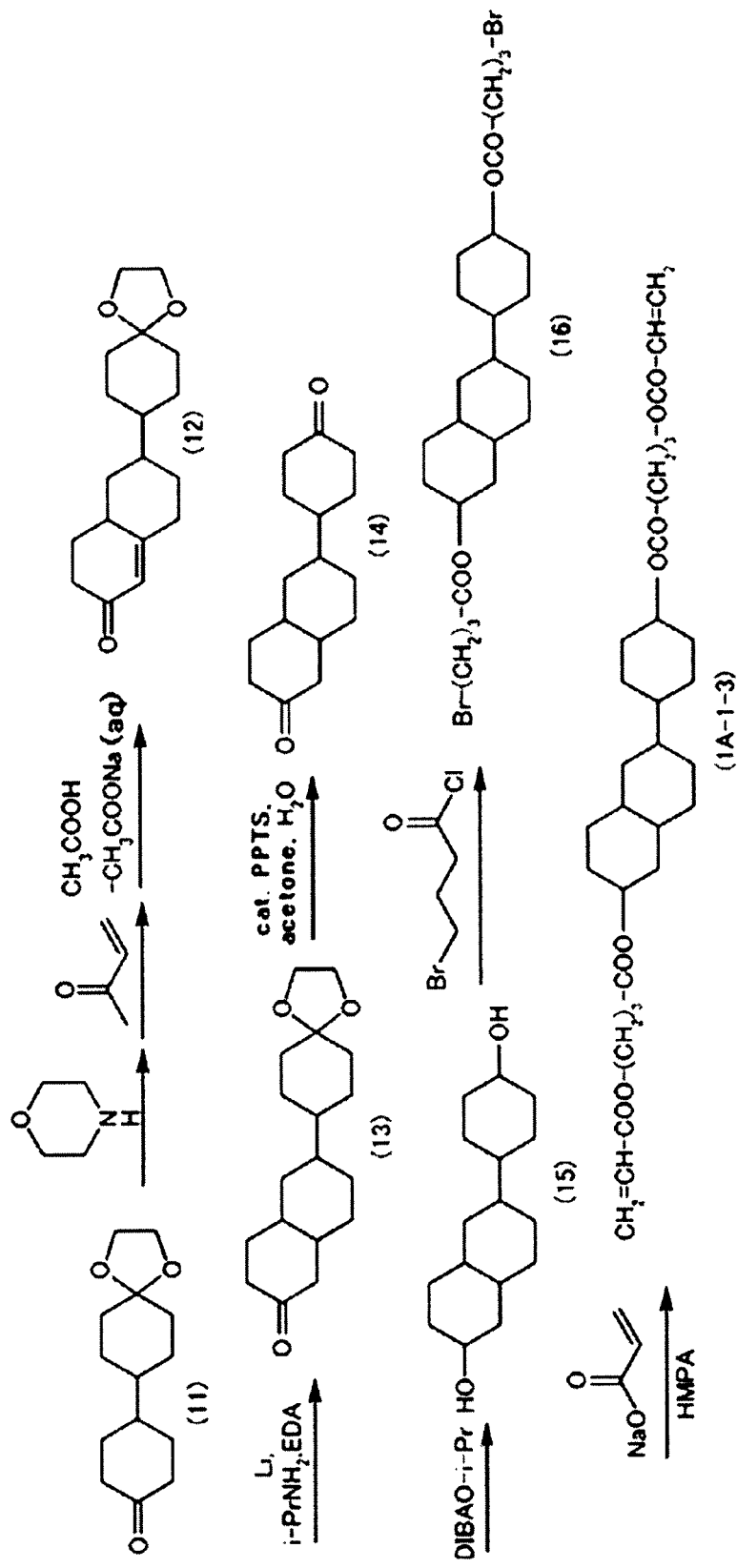
FIG. 1 is a view showing synthetic method (1) of the compound (1A-1).

Hitherto, it is known that replacement of trans-1,4-cyclohexylene group of a completely alicyclic compound with trans-2,6-decahydronaphthalene group improve liquid crystallinity. For example, In JP-A-57-130929, JP-A-2001-002619, and an academic bulletin, Chimia (1982), vol. 36, p. 460-462, trans-2,6-disubstituted trans-decahydronaphthalene derivatives have been disclosed or reported. However, such compounds are all non-polymerizable liquid crystalline compounds.

The present inventors have conducted extensive studies, and as a result, they have discovered that the compound represented by the following formula (1) has a good light stability against a blue laser beam and affords a good liquid crystallinity singly or together with another compositional compound after polymerization. In the formula (1), $E^1$ and $E^2$ are each independently a trans-1,4-cyclohexylene group or a trans-2,6-decahydronaphthalene group and either one of $E^1$ and $E^2$ is a trans-2,6-decahydronaphthalene group.

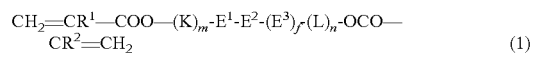

$$CH_2=CR^1-COO-(K)_m-E^1-E^2-(E^3)_f-(L)_n-OCO-CR^2=CH_2 \quad (1)$$

The following will explain the di(meth)acrylate compound of the present invention. In the following explanation, for convenience of explanation, not only an acrylate compound wherein $R^1$ and $R^2$ are each a hydrogen atom but also a methacrylate compound wherein $R^1$ and/or $R^2$ are each a methyl group is also generally referred to as an acrylate compound. Moreover, in the specification, the compound represented by the formula (1) is also referred to as diacrylate compound (1). Other compounds are also referred in the same manner. Moreover, the trans-1,4-cyclohexylene group and the trans-2,6-decahydronaphthalene group in this specification may be each a non-substituted group wherein hydrogen atoms bonded to carbon atoms in the group are not substituted by other groups, or a group wherein some or all of hydrogen atoms bonded to carbon atoms in the group may be each substituted by a fluorine atom or a methyl group. Furthermore, in the specification, a compound having both liquid crystallinity and polymerizability is referred to as a polymerizable liquid crystal. Further, a wavelength range includes a range of ±2 nm centering on the particular wavelength described. The refractive index anisotropy is abbreviated as Δn.

The diacrylate compound of the present invention is a compound represented by the above formula (1). The diacrylate compound (1) has both polymerizability and liquid crystallinity, or has polymerizability and also does not impair the liquid crystallinity of a composition as an ingredient of the composition.

In the diacrylate compound (1), $R^1$ and $R^2$ are each independently a hydrogen atom or a methyl group but are preferably hydrogen atoms. When $R^1$ and $R^2$ are hydrogen atoms, it is possible to make polymerization progress promptly at a time of photopolymerizing a polymerizable liquid crystalline composition mentioned below and containing the diacrylate compound (1) to obtain an optical anisotropic material. Moreover, there is also a merit that the properties of an optical element employing this optical anisotropic material become insusceptible to external environment such as temperature, and that the variation of retardation in the surface of the optical element becomes small.

In the diacrylate compound (1), m and n are each independently 0 or 1.

In the diacrylate compound (1), K is —$(CH_2)_pCOO$—, —$(CH_2)_pOCO$—, —$(CH_2)_pO$—, or —$(CH_2)_p$— (where each p is independently an integer of 1 to 8), wherein an ethereal oxygen atom may be present in a carbon to carbon bond and some or all of hydrogen atoms may be each substituted by a fluorine atom. K is preferably —$(CH_2)_pCOO$— or —$(CH_2)_p$—, and particularly preferably —$(CH_2)_pCOO$—.

In the diacrylate compound (1), L is —$OCO(CH_2)_q$—, —$COO(CH_2)_q$—, —$O(CH_2)_q$—, or —$(CH_2)_q$— (where each q is independently an integer of 1 to 8), wherein an ethereal oxygen atom may be present in a carbon to carbon bond and some or all of hydrogen atoms may be each substituted by a fluorine atom. L is preferably —$OCO(CH_2)_q$— or —$(CH_2)_q$—, and particularly preferably —$OCO(CH_2)_q$— since the case is advantageous for the exhibition of liquid crystallinity of a compound.

In general, when a polymerizable liquid crystal is polymerized, the value of Δn tends to decrease by polymerization. However, when K and L are groups each having a polymethylene group, the decreases of Δn by polymerization can be suppressed. Furthermore, from the viewpoint of securing the liquid crystallinity before polymerization, p and q are preferably each independently an integer of 2 to 4.

In the diacrylate compound (1), $E^1$ and $E^2$ are each independently a trans-1,4-cyclohexylene group or a trans-2,6-decahydronaphthalene group. Since the trans-2,6-decahydronaphthalene group shows a high viscosity as compared with the trans-1,4-cyclohexylene group, the number of the decahydronaphthalene group present in the diacrylate compound (1) is preferably one. Namely, it is preferred that one of $E^1$ and $E^2$ is the trans-2,6-decahydronaphthalene group and another one is the trans-1,4-cyclohexylene group. Thereby, in the case where a polymerizable liquid crystalline composition containing the diacrylate compound (1) is injected into a cell or in the case where the composition is cast on a substrate, it is easy to form a film having an even thickness.

Furthermore, in the above case, since the stability of the optical anisotropic material after polymerization increases, it is preferred that the trans-2,6-decahydronaphthalene group is present at a position near to the acrylic main chain after polymerization. For example, the case where $E^1$ is the trans-2,6-decahydronaphthalene group and $E^2$ is the trans-1,4-cyclohexylene group is preferable as compared with the case where $E^1$ is the trans-1,4-cyclohexylene group and $E^2$ is the trans-2,6-decahydronaphthalene group.

In the diacrylate compound (1), f is preferably 0.

The diacrylate compound (1) has a trans-2,6-decahydronaphthalene group and preferably further has a trans-1,4-cyclohexylene group. Consequently, the diacrylate compound (1) has a small molar absorbance coefficient in the wavelength region of a blue laser beam and thus a high light stability against a blue laser beam. Therefore, an optical anisotropic material obtained from a polymerizable liquid crystalline composition using the diacrylate compound (1) has a sufficient durability against a blue laser beam.

As mentioned above, the decrease of the value of Δn by polymerization can be suppressed by bonding a structure having a polymethylene group to an acryloyloxy group or a methacryloyloxy group.

In the meanwhile, it is known that a polymerizable liquid crystal having a polymethylene group has a reduced liquid crystallinity of a monomer before polymerization as compared with a polymerizable liquid crystal in which an acryloyloxy group or a methacryloyloxy group is directly bonded to a mesogen. Further, this is more remarkable in common diacrylate compounds. There was no example in which liquid crystallinity is exhibited in alicyclic diacrylate compounds, and this fact had inhibited introduction of an alicyclic diacrylate compound into a polymerizable liquid crystalline composition in a high concentration. However, since the diacrylate compound (1) has a trans-2,6-decahydronaphthalene group having a large liquid crystallinity, it is possible to maintain liquid crystallinity of a monomer before polymerization even when a structure having a polymethylene group is introduced and also it is possible to introduce the compound into a polymerizable liquid crystalline composition in a high concentration.

Accordingly, an optical element obtained by using the diacrylate compound (1) can afford a good light utilization efficiency in the case where the element is utilized in an optical head device. Namely, by using the diacrylate compound (1), there is provided an optical element having a sufficient durability against a blue laser beam and also excellent in properties such as phase difference.

Specific examples of the diacrylate compound (1) include the following compound (1A).

[Chem 1]

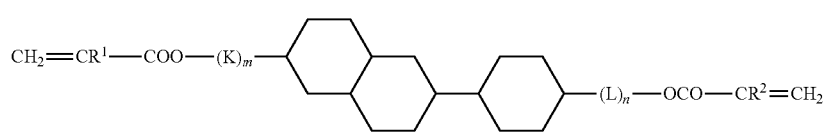

(1A)

In the compound (1A), it is preferred that $R^1$ and $R^2$ are hydrogen atoms and m and n are each independently 0 or 1. K is —(CH$_2$)$_p$COO—, —(CH$_2$)$_p$OCO—, —(CH$_2$)$_p$O—, or —(CH$_2$)$_p$—, L is —OCO(CH$_2$)$_q$—, —COO(CH$_2$)$_q$—, —O(CH$_2$)$_q$—, or —(CH$_2$)$_q$—, and from the viewpoint of securing liquid crystallinity, it is particularly preferred that p and q are each independently an integer of 2 to 4.

In the trans-1,4-cyclohexylene group and trans-2,6-decahydronaphthalene group in E$^1$ and E$^2$, some or all of hydrogen atoms bonded to carbon atoms in these groups may be substituted by a fluorine atom or a methyl group. However, in the present invention, the trans-1,4-cyclohexylene group and trans-2,6-decahydronaphthalene group are preferably unsubstituted groups where hydrogen atoms bonded to carbon atoms in these groups are not substituted by the other group.

As the compound (1A), the following compounds are preferably mentioned. However, p and q are preferably each independently an integer of 2 to 4. From the viewpoint of exhibiting liquid crystallinity, the trans-2,6-decahydronaphthalene group is preferably a trans-2,6-trans-decahydronaphthalene group.

pound (23) to obtain a compound (24). Then, using acetone/water as a solvent, the compound (24) is reacted with a catalytic amount of pyridinium-p-toluenesulfonic acid (PPTS) to obtain a compound (25). Thereafter, the compound (25) is reduced with sodium borohydride (NaBH$_4$) to obtain a compound (26). The compound (26) is reacted with a compound (27) to obtain a compound (28). Then, using hexamethylphorphoric triamide (HMPA) as a solvent, the compound (28) is reacted with sodium acrylate. Thereby, a compound (1A-1-p,q) that is a compound (1A-1) where p is not equal to q is obtained.

Synthesis of Compound (1A-2)

Figure 3:
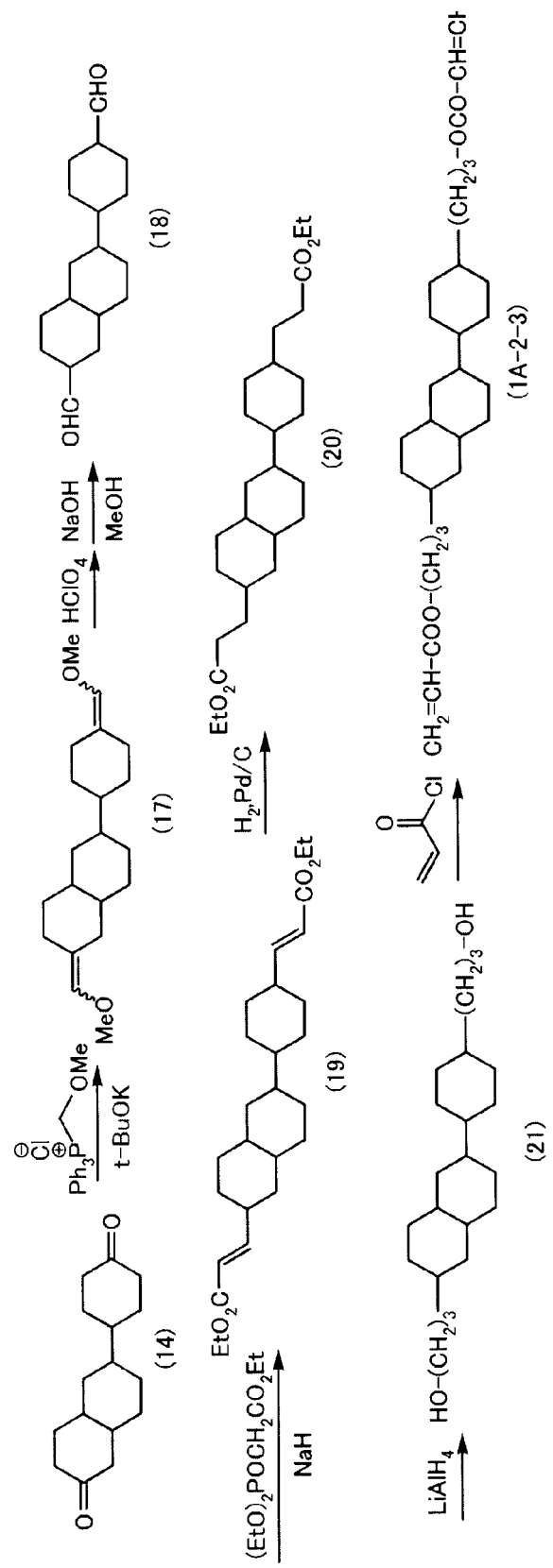
FIG. 3 is a view showing synthetic method of the compound (1A-2).

As shown in FIG. 3, a product obtained by reacting (methoxymethyl)triphenylphosphonium chloride with potassium tert-butoxide is reacted with the compound (14) to obtain a compound (17), and it is sequentially treated with an acid and a base to obtain a compound (18). Then, a product obtained by reacting ethyl diethylphosphonoacetate with sodium hydride

[Chem 2]

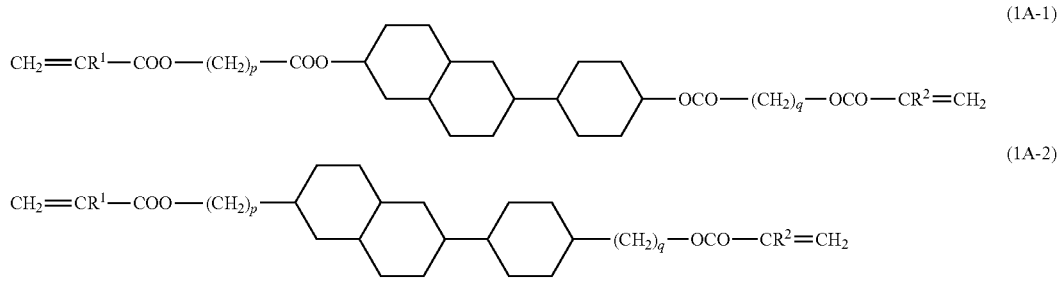

Synthetic processes of the diacrylate compound (1) of the present invention are explained with reference to specific examples. However, needless to say, the compound can be synthesized by a process other than the processes described in the following.

Synthesis (1) of Compound (1A-1)

As shown in FIG. 1, first, the compound (11) is sequentially reacted with morpholine, methyl vinyl ketone, and an aqueous acetic acid-sodium acetate solution to obtain a compound (12). Then, using isopropylamine as a solvent, the compound (12) is reduced with lithium (Li) in the presence of ethylenediamine (EDA) to obtain a compound (13). Then, using acetone/water as a solvent, the compound (13) is reacted with a catalytic amount of pyridinium-p-toluenesulfonic acid (PPTS) to obtain a compound (14). Thereafter, the compound (14) is reduced with isopropoxy diisobutylaluminum (DIBAO-i-Pr) prepared from diisobutylaluminum hydride and an equivalent amount of IPA, to obtain a compound (15). The compound (15) is reacted with 4-bromobutanoyl chloride to obtain a compound (16). Then, using hexamethylphosphoric triamide (HMPA) as a solvent, the compound (16) is reacted with sodium acrylate. Thereby, a compound (1A-1-3) that is a compound (1A-1) where p is 3 and q is 3 is obtained.

Synthesis (2) of Compound (1A-1)

Figure 2:
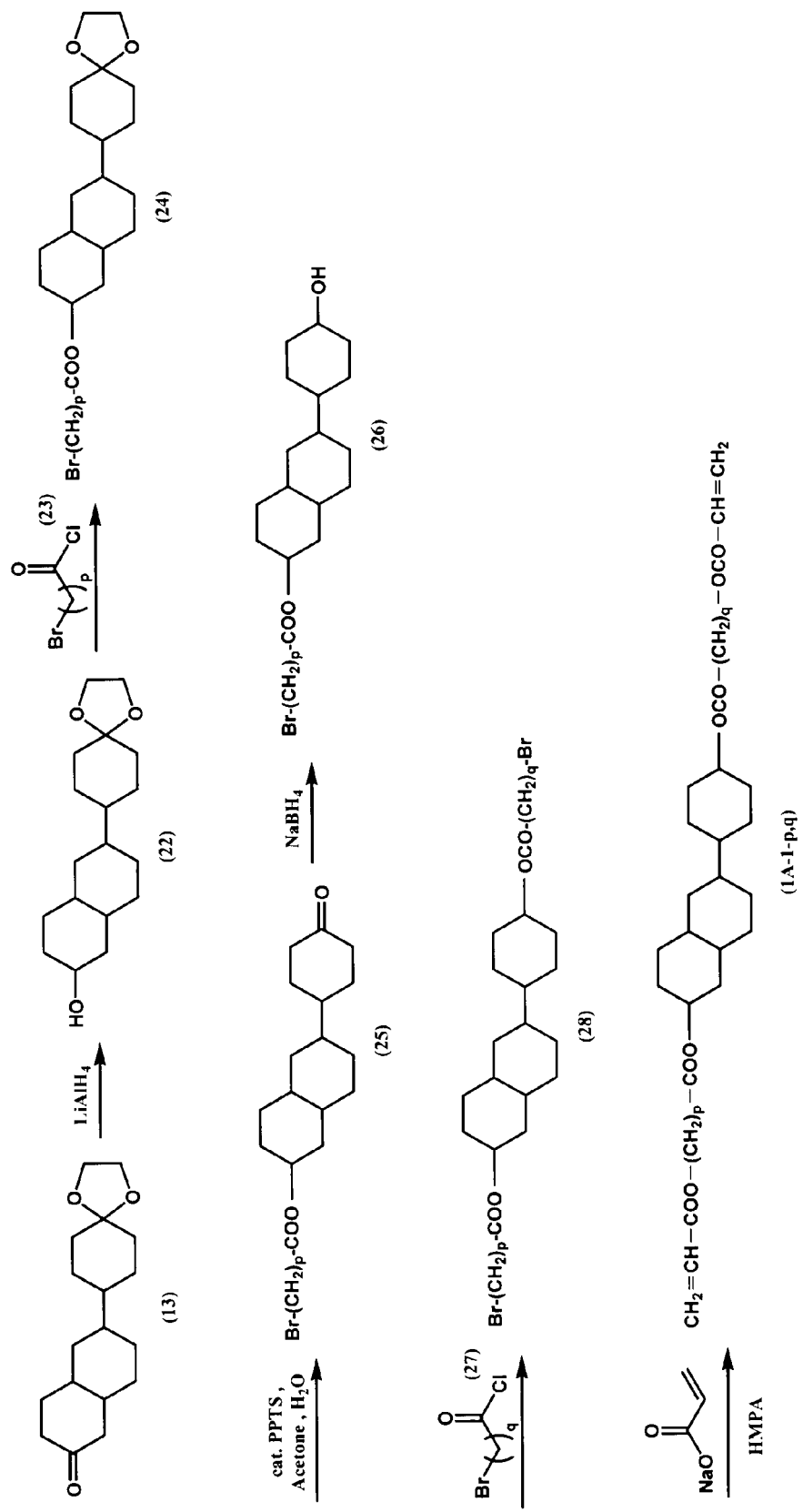
FIG. 2 is a view showing synthetic method (2) of the compound (1A-1).

As shown in FIG. 2, the above compound (13) is reduced with lithium aluminum hydride (LiAlH$_4$) to obtain a compound (22). Then, the compound (22) is reacted with a comis reacted with the compound (18) to obtain a compound (19). Then, the compound (19) is reacted with hydrogen gas in the presence of palladium/active carbon (Pd/C), to obtain a compound (20). Thereafter, the compound (20) is reduced with lithium aluminum hydride to obtain a compound (21). Then, the compound (21) is reacted with acryloyl chloride. Thereby, a compound (1A-2-3) that is a compound (1A-2) where p is 3 and q is 3 is obtained.

The diacrylate compound (1) of the present invention is preferably used as one ingredient of the polymerizable liquid crystalline composition for obtaining the optical anisotropic material. Since the diacrylate compound (1) is easy to exhibit liquid crystallinity singly or is hard to impair the liquid crystallinity of the composition obtained by using the compound together with the other ingredient, a polymerizable liquid crystalline composition containing one or more diacrylate compounds (1) exhibits liquid crystallinity in a wide temperature range and thus is easy to handle. In this case, the polymerizable liquid crystalline composition may contain a liquid crystalline compound other than the diacrylate compound (1).

The liquid crystalline compound other than the diacrylate compound (1) contained in the polymerizable liquid crystalline composition is preferably a compound having an acryloyloxy group or a methacryloyloxy group, and particularly preferably a compound having an acryloyloxy group. Furthermore, the liquid crystalline compound preferably has a mesogenic structure containing no aromatic ring structure, from the viewpoint of improving durability against a blue laser beam. However, the liquid crystalline compound is not limited thereto and, in consideration of extension of liquid crystallinity, high Δn, and retardation retention, may contain an aromatic ring structure. Moreover, also form the viewpoint of the durability against a blue laser beam, a liquid crystalline compound having a fluorinated alkylene chain having effects of low molar absorbance coefficient, increase in density of the liquid crystalline phase structure, and the like can be also preferably used.

As the polymerizable liquid crystalline compound other than the diacrylate compound (1) or the polymerizable non-liquid crystalline compound having a similar structure to the diacrylate compound (1), various types of known compounds may be employed. Preferred compounds include a mono-functional compound (2A) and a bifunctional compound (2B) as shown below.

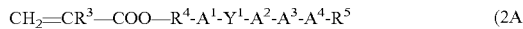
(2A)

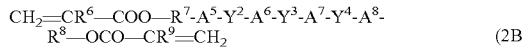
(2B)

$R^3$, $R^6$, and $R^9$ represent each independently a hydrogen atom or a methyl group.

$R^4$, $R^7$, and $R^8$ represent each independently a single bond or an alkylene group having 1 to 15 carbon atoms, and when it is an alkylene group, an ethereal oxygen atom may be present in a carbon to carbon bond in the alkylene group or at an end of the group to be bonded to a cyclic group, and further, a carboxyl group may be present at an end of the group to be bonded to a cyclic group, and some or all of hydrogen atoms bonded to carbon atoms in the alkylene group may be each substituted by a fluorine atom.

$R^5$ represents an alkyl group having 1 to 12 carbon atoms, an alkoxy group having 1 to 12 carbon atoms, an alkylcarbonyloxy group having 1 to 12 carbon atoms, or a fluorine atom, and when it is an alkyl group, an alkoxy group, or an alkylcarbonyloxy group, some or all of hydrogen atoms bonded to carbon atoms in each of these groups may be each substituted by a fluorine atom.

$Y^1$ and $Y^2$ represent each independently a single bond or —COO—, $Y^3$ represents a single bond or —CH$_2$—CH$_2$—, and $Y^4$ represents a single bond or —COO—.

$A^1$, $A^2$, $A^3$, $A^4$, $A^5$, $A^6$, $A^7$, and $A^8$ represent each independently a single bond, a trans-1,4-cyclohexylene group, or a 1,4-phenylene group. However, one of $A^1$, $A^2$, and $A^3$ may be a naphthalene-1,4-diyl group, a naphthalene-1,5-diyl group, a naphthalene-2,6-diyl group, or a trans-2,6-decahydronaphthalene group. The combination of $A^1$, $A^2$, $A^3$, and $A^4$ and the combination of $A^5$, $A^6$, $A^7$, and $A^8$ include each independently at most two single bonds and at least one trans-1,4-cyclohexylene group, and no three-continuous 1,4-phenylene groups, and some or all of hydrogen atoms in the trans-1,4-cyclohexylene group, the 1,4-phenylene group, the naphthalene-diyl group, or the trans-2,6-decahydronaphthalene group may be each substituted by a fluorine atom or a methyl group.

The polymerizable liquid crystalline composition may contain a non-liquid crystalline polymerizable compound or a non-polymerizable liquid crystalline compound. However, the polymerizable liquid crystalline composition preferably contains a polymerizable liquid crystalline compound in an amount of 50% by mass or more, more preferably contains in an amount of 80% by mass or more. Moreover, in the case where the polymerizable liquid crystalline composition contains one or more diacrylate compounds (1) and one or more polymerizable liquid crystalline compounds other than the diacrylate compound (1), the ratio of the diacrylate compound (1) to the total amount of the diacrylate compound (1) and the polymerizable liquid crystalline compounds other than the diacrylate compound (1) is preferably 5% by mol to 100% by mol. Particularly, the ratio is preferably 20% by mol or more, and particularly preferably 50% by mol or more.

Examples of non-polymerizable non-liquid crystalline compound include additives such as a polymerization initiator, a polymerization inhibitor, a chiral agent, a UV absorber, an antioxidant, a photostabilizer and a colorant. The amount of the additives is preferably 5% by mass or less based on the polymerizable liquid crystalline composition, and it is more preferably 2% by mass or less. In the case where the other non-polymerizable compound is added, it is used within a range not impairing the effects of the present invention, and specifically, the amount of the other compound is preferably 10% by mass or less and more preferably 5% by mass or less.

As the non-liquid crystalline polymerizable compound, a chiral agent (or a chiral dopant) is mentioned. By adding it to the polymerizable liquid crystalline composition, a polymerizable cholesteric liquid crystalline composition can be obtained. Since a cholesteric liquid crystal has optical properties different from a nematic liquid crystal or a smectic liquid crystal, it is possible to develop an optical element which cannot be realized with a polymerizable liquid crystalline composition such as a nematic liquid crystalline composition or a smectic liquid crystalline composition.

A cholesteric liquid crystal is composed of a large number of laminated layers and, in one thin layer thereof, liquid crystal molecules are aligned in a direction with the long axis being parallel to the layer. Also, the direction of the molecules is different every adjacent layer by a little degree and a spiral structure is formed as a whole. Therefore, the liquid crystal molecules exhibit specific optical properties. Specifically, as a result that the liquid crystal molecules have a spirally twisted alignment, either one of left-handed/right-handed circularly polarized light components is selectively reflected corresponding to the spiral pitch. For example, when transmittance of a cholesteric liquid crystal is measured with using the circularly polarized light showing selective reflection, a transmission spectrum having a sharp wavelength dependence, i.e., a spectrum having a rectangle in a wavelength band region having the selective reflection is obtained. This property can be applied to a mirror which reflects a light having a particular wavelength, a reflective diffraction grating, a circularly polarized light diffraction element by refractive index anomalous dispersion utilizing the reflection band, and the like.

The polymerizable chiral dopant is not particularly limited but polymerizable chiral dopants composed of isosorbide derivatives or isomannide derivatives represented by the following compounds (C1-1) to (C1-4) and the like are preferred.

[Chem 3]

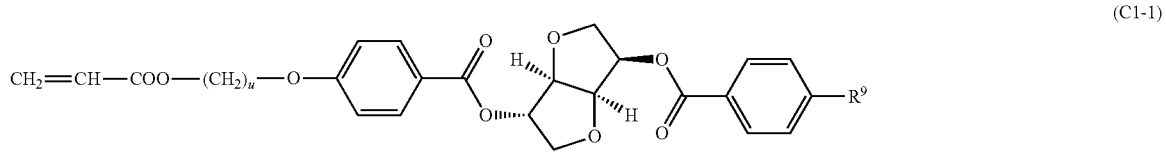
(C1-1)

-continued

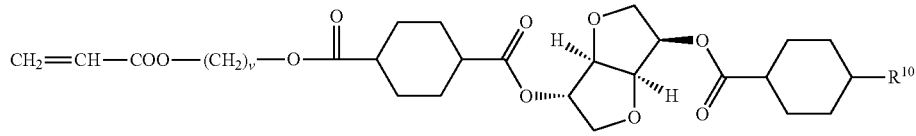
(C1-2)

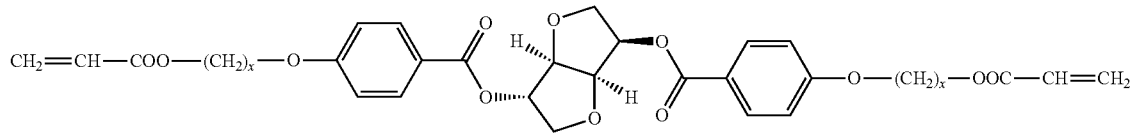
(C1-3)

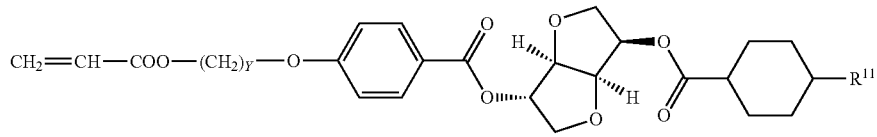
(C1-4)

The signs in the formulae show the following meanings.

$R^9$ to $R^{11}$: each independently an alkyl group having 1 to 8 carbon atoms u, v, x, y: an integer of 2 to 8

The following will explain the optical anisotropic material of the present invention.

The optical anisotropic material of the present invention contains a polymer obtainable by polymerizing the polymerizable liquid crystalline composition in a state that the composition shows a liquid crystal phase and in a state that the liquid crystal is aligned.

The state that the polymerizable liquid crystalline composition shows a liquid crystalline phase, can be maintained by making the ambient temperature at most the phase transition temperature ($T_c$) (° C.) of nematic phase-isotropic phase. However, since Δn of the polymerizable liquid crystalline composition is extremely small at a temperature close to $T_c$, the upper limit of the ambient temperature is preferably at most ($T_c$−10) (° C.).

As the polymerization, photopolymerization or thermal polymerization etc. may be mentioned. From the viewpoint of easiness of curing while maintaining liquid crystallinity, photopolymerization is preferred. As light to be used for the photopolymerization, UV rays or visible light is preferred. In a case of carrying out photopolymerization, a photopolymerization initiator is preferably employed. For example, a photopolymerization initiator appropriately selected from an acetophenone, a benzophenone, a benzoin, a benzyl, a Michler's ketone, a benzoin alkyl ether, a benzyl dimethyl ketal, and a thioxanthone is preferably employed. The photopolymerization initiators may be used alone or in combination of two or more thereof. The amount of the photopolymerization initiator is preferably from 0.01 to 5% by mass and particularly preferably from 0.01 to 2% by mass based on the total amount of the polymerizable liquid crystalline composition.

The optical anisotropic material can be obtained by polymerizing the above-mentioned polymerizable liquid crystalline composition in a state that it is sandwiched between a pair of substrates each having a surface on which an alignment treatment is applied. The following will describe specific examples.

First, a transparent substrate is prepared. As the transparent substrate, for example, a substrate made of a material having a high transmittance for visible light may be employed. Specifically, there may be mentioned a substrate made of an inorganic glass such as an alkaline glass, a non-alkaline glass, or a quartz glass; or a transparent resin such as polyester, polycarbonate, polyether, polysulfone, polyether sulfone, polyvinyl alcohol, or a fluoropolymer such as polyvinyl fluoride. From the viewpoint of high rigidity, a substrate made of an inorganic glass is preferably employed. The thickness of the transparent substrate is not particularly limited, and usually, it is from 0.2 to 1.5 mm, preferably from 0.3 to 1.1 mm. The transparent substrate may be provided with a surface treatment layer made of an inorganic material or an organic material for the purpose of preventing alkaline elution, improving adhesiveness, preventing reflection, or obtaining a hard coat function as need arises.

Next, an alignment treatment is applied to a surface of the transparent substrate. For example, an alignment film is formed on the transparent substrate, and an alignment treatment is applied to the alignment film. The alignment film may be any one so long as it has a function of aligning the liquid crystal. For example, use may be made of an organic material such as polyimide, polyamide, polyvinyl alcohol, polyvinyl cinnamate and polystyrene, or an inorganic material such as $SiO_2$ and $Al_2O_3$. The alignment treatment may, specifically, be carried out by using a rubbing method or the like. For example, by rubbing a surface of the alignment film in one direction by using a rubbing cloth made of nylon or rayon, it becomes possible to make liquid crystal molecules align in the direction. Moreover, other than the rubbing method, it is possible to uniformly align liquid crystal molecules by oblique vapor deposition of $SiO_2$, an ion beam method, a photoalignment film, or the like.

Next, an optical anisotropic material is formed on the alignment film. Besides the above transparent substrate (hereinafter referred to as first substrate), a second substrate having a surface on which an alignment film is formed is newly prepared. This alignment film may be formed in the same manner as in the case of the first substrate. Then, as the case requires, a release-treatment is applied on the surface of the second substrate at the side on which the alignment film is formed. As the release agent, for example, a fluoropolymer of fluorosilane type or a fluoropolymer having a fluoroalicyclic structure may be employed. Next, on this second substrate, the first substrate is overlaid and they are temporarily or non-temporarily bonded so that a gap is present between them. The overlay is made so that the surface of the second substrate on which the release-treatment is applied and the surface of the first substrate on which the alignment film is formed face to the inside to each other. Moreover, an opening capable of injecting the polymerizable liquid crystalline composition from the outside is provided in advance.

Next, through the opening, the polymerizable liquid crystalline composition is injected between the substrates. This injection may be carried out by a vacuum injection method or a method using a capillary phenomenon in the atmospheric air. After the injection of the polymerizable liquid crystalline composition, the polymerizable liquid crystalline composition is polymerized by irradiation with light having a predetermined wavelength. As the case requires, a heating treatment may be further applied after the light irradiation. Thereafter, as the case requires, by removing the second substrate that has been temporarily bonded, a structure in which the alignment film and an optical anisotropic material are formed on the first substrate can be obtained. In the present embodiment, the polymerizable liquid crystalline composition is aligned in a direction substantially parallel to the surface of the first substrate, and the optical anisotropic material in a state that such an alignment is fixed is obtained. In an application where no further processing is needed, such as a phase plate, it is also possible to use the material as it is, without removing the second substrate.

Furthermore, formation of the optical anisotropic material may also be carried out, for example, in the following procedure.

First, a first substrate on which an alignment film is formed and a second substrate on which an alignment film is formed and further a release agent is applied thereon as the case requires, are prepared. Next, on the alignment film formed on the first substrate, a photocurable polymerizable liquid crystalline composition is dropped. Thereafter, the second substrate is overlaid on the first substrate so that the surface of the second substrate on which the release agent is applied faces to the polymerizable liquid crystalline composition. Next, the resulting one is irradiated with light having a predetermined wavelength to polymerize the polymerizable liquid crystalline composition. Thereafter, by removing the second substrate as the case requires, a structure in which the alignment film and the optical anisotropic material are formed on the first substrate can be obtained as described above.

The optical anisotropic material of the present invention can be employed as a material of an optical element. In the above explanation, only the alignment film is mentioned to simplify the explanation, but it is possible to provide an electrode for the purpose of controlling optical properties, or it is possible to provide a reflective film for the purpose of using as a reflection type element, whereby an optical element can be formed. Furthermore, depending on the purpose, it is possible to provide a Fresnel lens structure, a grating for diffraction grating, a colored layer for color tone adjustment, a low reflective layer for suppressing stray light, or the like on a surface of the substrate.

The optical element of the present invention may have a construction wherein two optical elements are combined. Moreover, the optical element may be used in combination with another optical element such as a lens, a wavefront correction surface, a retardation plate, an iris, a diffraction grating, or the like. In the case of combining two optical elements, such a structure may be formed by forming these optical elements each employing two substrates and laminating them, or such a structure may be formed by forming two liquid crystal layers among three substrates.

It is possible to prepare an optical element such as a diffraction grating such as a polarizing hologram, a retardation plate and a wavefront correction element, by employing the optical anisotropic material of the present invention. As the polarizing hologram, an example of separating signal light which is generated from a light emitted from a laser light source and reflected on an information-recording plane of an optical disk, and guiding such signal light to a photodetector, is mentioned. As the retardation plate, an example of employing as a half wavelength plate to control the phase difference of light emitted from a laser light source, or an example of using as a quarter wavelength plate to be disposed in an optical path and stabilizing the output of a laser light source, may be mentioned. Furthermore, the optical anisotropic material of the present invention is also applicable to a retardation plate, a polarizer, or the like for projector application.

For example, it is possible to constitute a diffraction grating wherein a first member made of a first material containing the optical anisotropic material of the present invention and a second member made of a second material having an isotropic refractive index are alternately disposed to form a grating shape. By alternately disposing the first member having an optical anisotropy and the second member that is isotropic, light passing through these members causes a diffraction that varies depending on the polarization direction of the incident light, whereby a diffraction grating having a polarizing dependence is constituted.

The optical element having the optical anisotropic material of the present invention is suitable to be employed for an optical information writing/reading device for writing information in an optical recording medium and/or for reading the information recorded in an optical recording medium. Specifically, the optical element of the present invention is preferably disposed in an optical path of a laser beam in an information writing/reading device. Particularly, the element is suitable for an optical head for an optical information writing/reading device using a blue laser beam, such as BD. Besides this application, the optical element can be preferably used as an imaging element in projector application or in a communication device in a wavelength-variable filter application.

For example, in an optical information writing/reading device provided with the above diffraction grating, light reflected on an optical recording medium is diffracted by the diffraction grating. Here, the optical information writing/reading device may have, besides the diffraction grating, a light source for emitting light to be incident into the diffraction grating, an objective lens for focusing light emitted from the light source on the optical recording medium, a detector for detecting light reflected on the optical recording medium, and the like.

Moreover, an optical information writing/reading device may have a retardation plate prepared by employing the optical anisotropic material of the present invention. The retardation plate in this case plays a role of transmitting light from a light source and changing the polarization state of the light reflected on an optical disk. For example, when the retardation plate is a quarter wavelength plate, the polarization state of light from the light source or light reflected on the optical disk is transformed its polarization plane by the retardation plate such that linearly polarized light is transformed into circularly polarized light or elliptically polarized light and circularly polarized light is transformed into linearly polarized light. Furthermore, when the retardation plate is a half wavelength plate instead of the quarter wavelength plate, P polarized light is transformed into S polarized light, S polarized light is transformed into P polarized light, circularly polarized light (dextrorotation) is transformed into circularly polarized light (levorotation), and circularly polarized light (levorotation) is transformed into circularly polarized light (dextrorotation).

Figure 4:
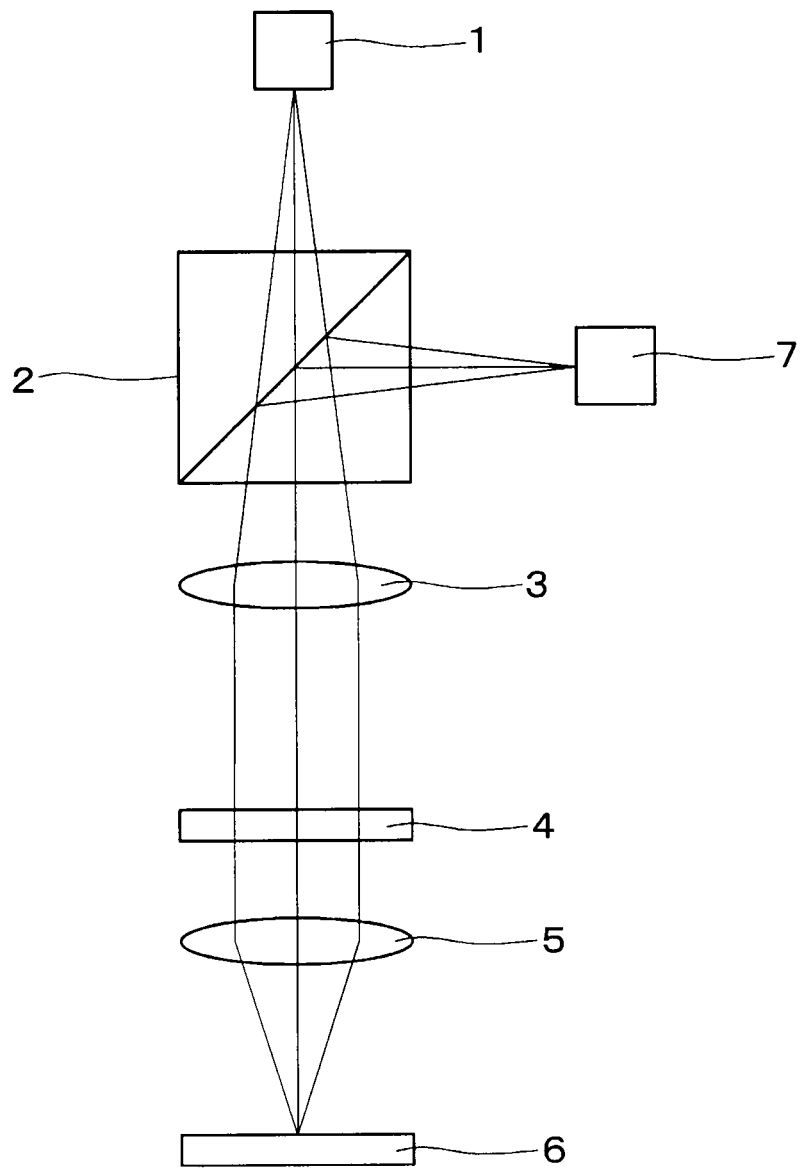
FIG. 4 is a construction view of the optical information writing/reading device of the embodiment of the present invention.

FIG. 4 shows an example of an optical information writing/reading device employing the retardation plate of the present invention. In this optical information writing/reading device, the information recorded in an optical disk is read out in the following manner.

Linearly polarized light emitted from a light source 1 is transmitted through a beam splitter 2, a collimator lens 3, a retardation plate 4 and an objective lens 5, and reaches an information-recording plane of an optical disk 6. Among this process, the linearly polarized light is transmitted through the beam splitter 2 without changing its polarized direction, and is transformed into circularly polarized light by the retardation plate 4 having a phase difference of quarter wavelength. Thereafter, the light is reflected on the information-recording plane of the optical disk 6 to be transformed into circularly polarized light of reverse roll, and traces back through the objective lens 5, the retardation plate 4 and the collimator lens 3 in this order through the returning path in the reverse order of the outgoing path. Here, by the retardation plate 4 in the returning path, the circularly polarized light is transformed into linearly polarized light orthogonal to the light before incidence. Accordingly, since the polarization direction of the linearly polarized light in the returning path is shifted from that in the outgoing path by 90°, the traveling direction of the light in the returning path is turned by 90° when it passes through the beam splitter 2, and the light reaches a photodetector 7.

As the light source 1, a normal laser light source to be employed for normal optical information writing/reading device is used. Specifically, a semiconductor laser is suitable, but it may be any one of other lasers. Since the retardation plate 4 has a good light stability against a blue laser beam, it is possible to increase the capacity of an optical information writing/reading device by using a blue laser beam as a light source.

Here, the optical anisotropic material of the present invention may be applied to the beam splitter 2 of FIG. 4. Specifically, it is disposed as a polarization-dependent diffraction grating. With such a construction, it is possible to increase the transmittance for light having a polarization direction of the outgoing path, and it is possible to increase the diffraction efficiency of light having a polarization direction of the returning path that is orthogonal to the polarization direction of the outgoing path. Accordingly, it is possible to further improve the light utilization efficiency of the entire optical information writing/reading device.

The following will describe Examples and Comparative Examples of the present invention.

Synthesis of Diacrylate Compound

Example 1

Step 1-1

First, a compound (12) was synthesized according to the following reaction equation.

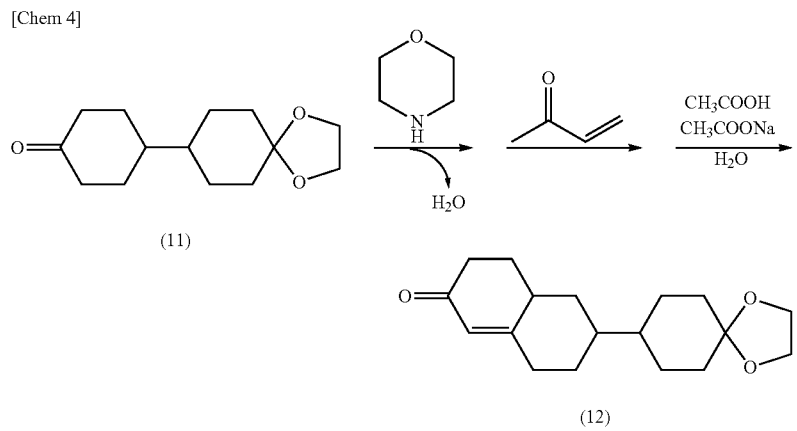

[Chem 4]

To a 1000 mL eggplant-shaped flask equipped with a refluxing apparatus, a stirrer, and a water-separating apparatus were added 120 g (0.50 mol) of the compound (11), 500 mL of toluene, and 65.8 mL (0.76 mol) of morpholine, followed by refluxing at 125° C. for 16 hours under stirring. After reaction was completed, the temperature was returned to room temperature and morpholine and toluene were removed under reduced pressure. After toluene (500 mL) was again added thereto and the whole was ice-cooled, 44.1 g (0.63 mol) of methyl vinyl ketone was added dropwise. After dropwise addition, the mixture was refluxed at 125° C. for 8 hours and then was allowed to cool to room temperature. An aqueous solution of 20.7 g (0.25 mol) of sodium acetate, 45.4 g (0.76 mol) of acetic acid, and 68.5 mL of water prepared beforehand was added thereto, followed by again refluxing at 125° C. for 12 hours and then allowed to cool. After reaction was completed, the organic phase was recovered, then the aqueous phase was extracted with ethyl acetate, and the extract was combined with the recovered organic phase. The organic phase was washed with a 1N hydrochloric acid solution, a saturated aqueous solution of sodium bicarbonate, and saturated saline sequentially, and dried over anhydrous sodium sulfate and then the solvent was removed under reduced pressure to obtain an unpurified compound (12). The compound was purified by column chromatography using hexane/ethyl acetate (3:2, volume ratio) as a developing liquid and further recrystallization was performed from hexane/dichloromethane to thereby obtain 53.4 g of the compound (12). The yield was 37%.

Step 1-2

Next, using the compound (12), a compound (13) was synthesized according to the following reaction equation.

[Chem 5]

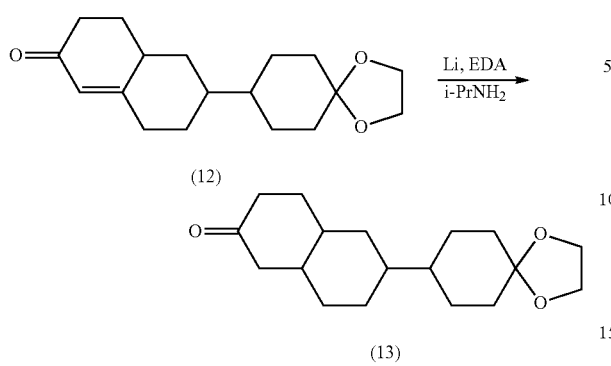

To a 2000 mL eggplant-shaped flask was added 53.4 g (0.18 mol) of the compound (12). Under a nitrogen atmosphere, 500 mL of dehydrated isopropylamine and 60 mL (0.90 mol) of ethylenediamine (EDA) were sequentially added thereto. After cooling to 0° C., 5.0 g (0.72 mol) of metal lithium (Li) cut into pieces having a weight of 0.075 g per piece was charged thereto over a period of 5 hours and the mixture was stirred at 0° C. to 20° C. for 12 hours. Thereafter, methanol and water were sequentially added under ice cooling to terminate the reaction, and isopropylamine, ethylenediamine, and methanol were removed under reduced pressure. Ethyl acetate was added thereto and the mixture was subjected to similar post treatment as in the step 1-1 to obtain an unpurified mixture (13). This was purified by column chromatography using hexane/ethyl acetate (3:2, volume ratio) as a developing liquid to obtain 30.0 g of the compound (13). The yield was 56%.

Step 1-3

Next, using the compound (13), a compound (14) was synthesized according to the following reaction equation.

[Chem 6]

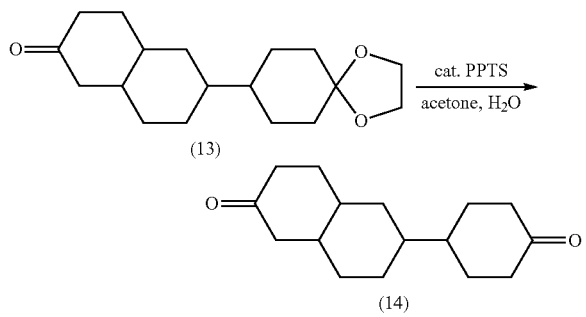

To a 1000 mL eggplant-shaped flask were added 30.0 g (102.6 mmol) of the compound (13), 400 mL of acetone, 100 mL of water, and 2.6 g (10.3 mmol) of pyridinium-p-toluenesulfonic acid (PPTS) as a catalyst, followed by stirring at 60° C. for 14 hours. Thereafter, a saturated aqueous solution of sodium bicarbonate was added to terminate the reaction. After the solvent was removed under reduced pressure, the mixture was extracted with ethyl acetate. After the organic phase was washed with saturated saline and dried over anhydrous sodium sulfate, the solvent was removed under reduced pressure to obtain an unpurified compound (14). The yielded amount was 22.9 g.

Step 1-4

Next, using the compound (14), a compound (15) was synthesized according to the following reaction equation.

[Chem 7]

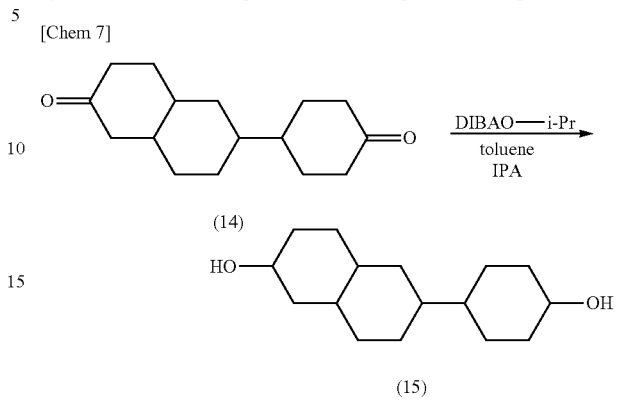

To a 500 mL eggplant-shaped flask were added 4.6 g (18.5 mmol) of the compound (14), 100 mL of toluene, 43.8 mL (40.7 mmol) of 0.93M isopropoxydiisobutylaluminum (DIBAO-i-Pr) prepared from a toluene solution of diisobutylaluminum hydride and equimolar isopropyl alcohol (IPA), and 14.3 mL (185 mmol) of IPA, followed by stirring at 20° C. for 12 hours. Thereafter, 40 mL of 1N hydrochloric acid was added, the mixture was stirred for 30 minutes, and 60 mL of a 2N aqueous solution of sodium hydroxide was added, followed by stirring for 1 hour. After the mixture was extracted with ethyl acetate and the organic phase was washed with saturated saline and dried over anhydrous sodium sulfate, the solvent was removed under reduced pressure to obtain an unpurified compound (15). This was purified by column chromatography using dichloromethane/methanol (19:1, volume ratio) as a developing liquid and further recrystallized from dichloromethane/methanol to obtain 2.2 g of the compound (15). The yield was 46%.

Step 1-5

Next, using the compound (15), a compound (16) was synthesized according to the following reaction equation.

[Chem 8]

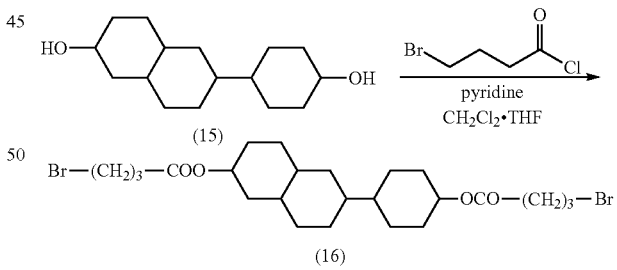

To a 300 mL four-neck flask were added 2.2 g (8.6 mmol) of the compound (15), 1.9 mL (24.0 mmol) of pyridine, 60 mL of dichloromethane, and 10 mL of THF. Under a nitrogen stream, 2.5 mL (21.4 mmol) of 4-bromobutanoyl chloride was added dropwise under ice cooling so that inner temperature did not exceed 20° C. After stirring for 1 hour under ice cooling without further treatment, an aqueous ammonium chloride solution was added dropwise to terminate reaction. After the organic phase is recovered and the aqueous phase is extracted with dichloromethane, this extract is added to the recovered organic phase. After the organic phase was washed with a saturated aqueous solution of sodium bicarbonate and saturated saline, sequentially, and dried over anhydrous sodium sulfate, the solvent was removed under reduced pressure to obtain an unpurified compound (16).

Step 1-6

Next, using the compound (16), a compound (1A-1-3) was synthesized according to the following reaction equation.

[Chem 9]

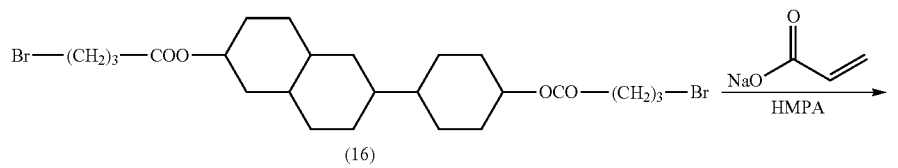

(16)

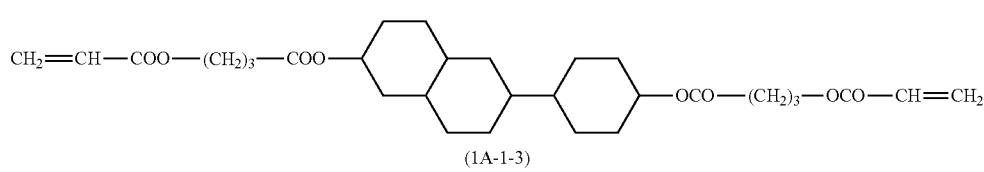

(1A-1-3)

To a 300 mL eggplant-shaped flask were added the above unpurified compound (16), 4.0 g (42.8 mmol) of sodium acrylate, 50 mL of hexamethylphosphoric triamide, and 10 mL of THF. After stirring at 50° C. for 12 hours, an aqueous solution of ammonium chloride was added dropwise to terminate the reaction. After the organic phase is recovered and the aqueous phase is extracted with ethyl acetate, this extract is added to the recovered organic phase. The organic phase was dried over anhydrous sodium sulfate and the solvent was removed under reduced pressure to thereby obtain an unpurified compound (1A-1-3). This was purified by column chromatography using dichloromethane as a developing liquid and further recrystallization was performed from dichloromethane/hexane to obtain 1.2 g of a liquid crystalline diacrylate compound (1A-1-3). The yield was 26% through two steps of Step (1-5) and Step (1-6).

Figure 5:
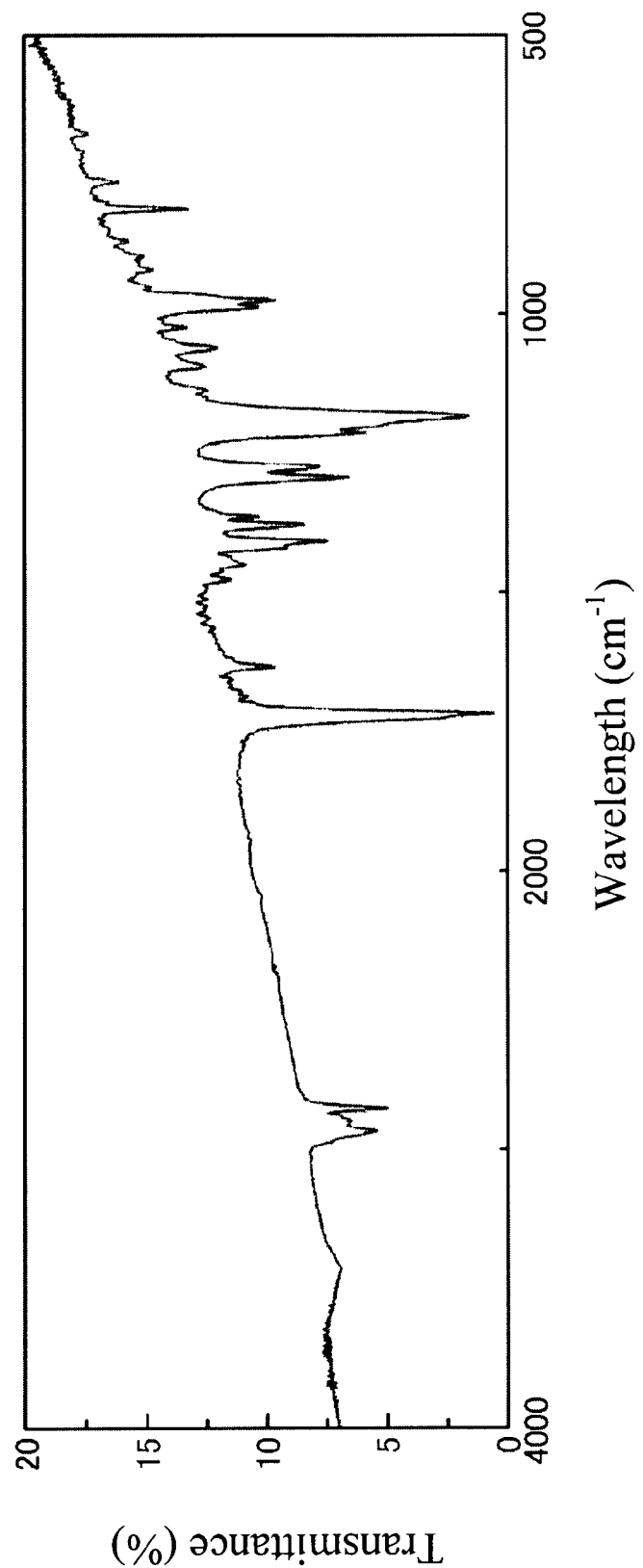
FIG. 5 is a view showing the IR spectrum of compound (1A-1-3) of the present invention.

FIG. 5 shows an IR spectrum of the diacrylate compound (1A-1-3). Moreover, the values of $T_m$ and $T_c$ and $^1$HNMR spectrum are shown below.

$T_m$: 30° C., $T_c$: 65° C. (under descending temperature)

$^1$HNMR (400 MHz, solvent: $CDCl_3$, internal standard: TMS) δ (ppm): 0.60-2.03 (m, 28H), 2.38 (t, 4H), 4.19 (t, 4H), 4.64 (m, 1H), 4.72 (m, 1H), 5.83 (d, 2H), 6.11 (dd, 2H), 6.40 (d, 2H).

Example 2

The following compound (1A-1-4) was obtained by applying Step (1-6) subsequently to a product obtained in the entirely same manner as in Example 1 except that 4-bromobutanoyl chloride is changed to 5-bromopentanoyl chloride (or 5-bromovaleryl chloride) in Step (1-5) of Example 1. The yield was 49% through the two steps.

[Chem 10]

(1A-1-4)

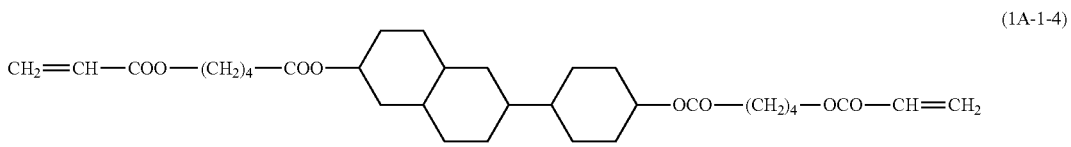

Figure 7:
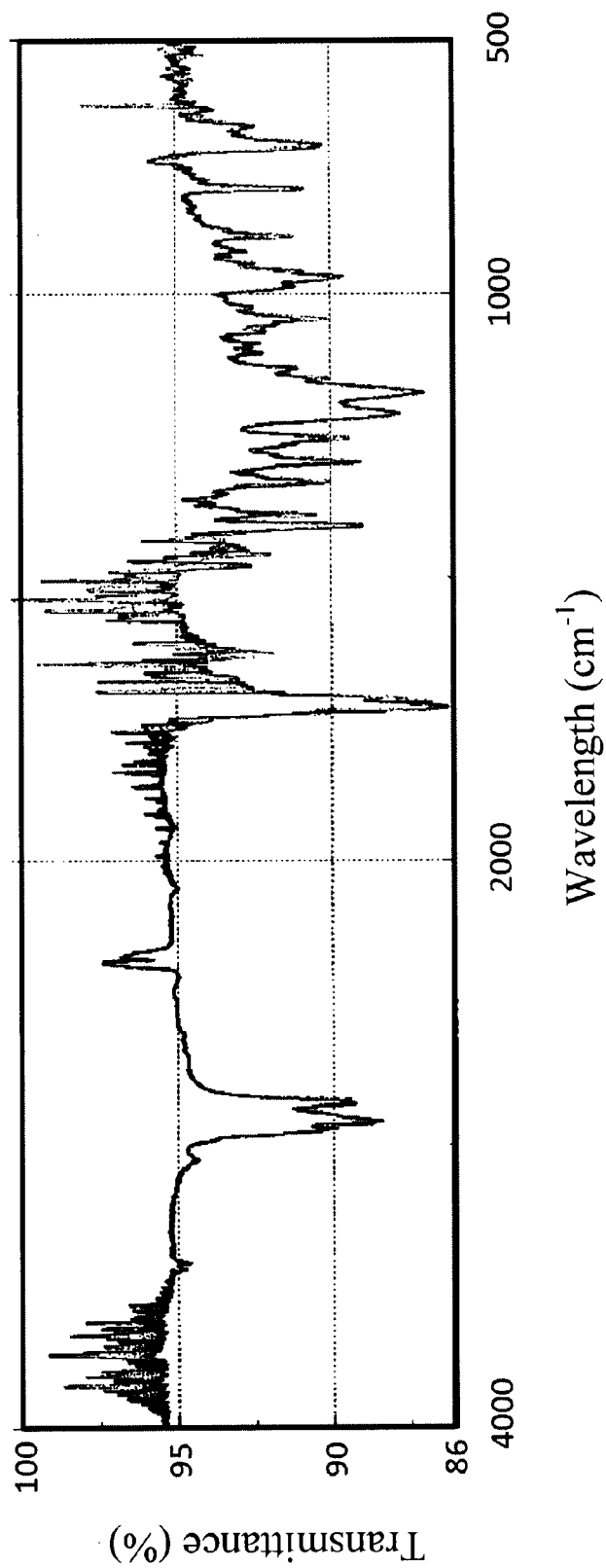
FIG. 7 is a view showing the IR spectrum of compound (1A-1-4) of the present invention.
Figure 8:
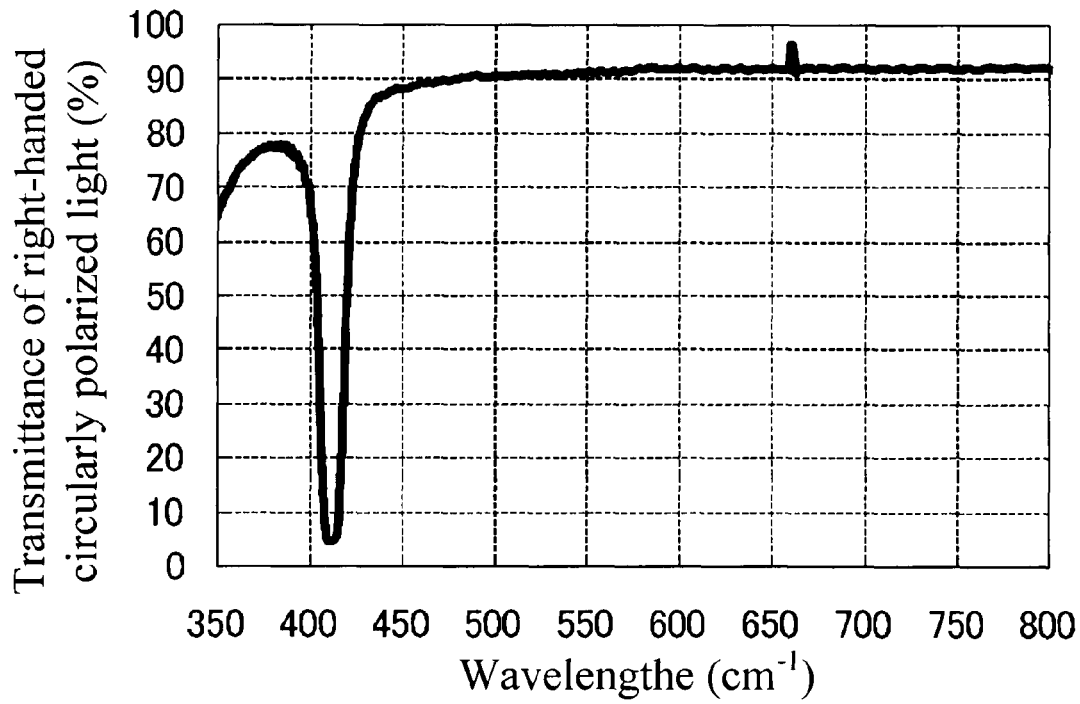
FIG. 8 is the transmittance spectrum in right-handed circularly polarized light of the cured film J3 of the present invention.
Figure 9:
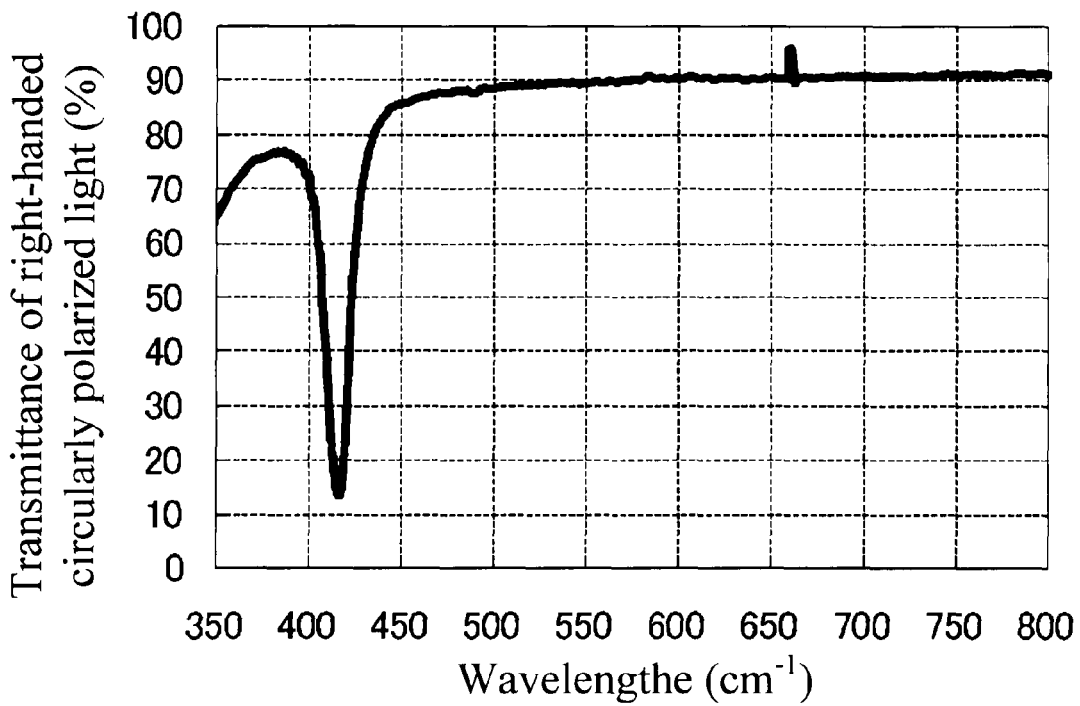
FIG. 9 is the transmittance spectrum in right-handed circularly polarized light of the cured film K3 of the present invention.
Figure 10:
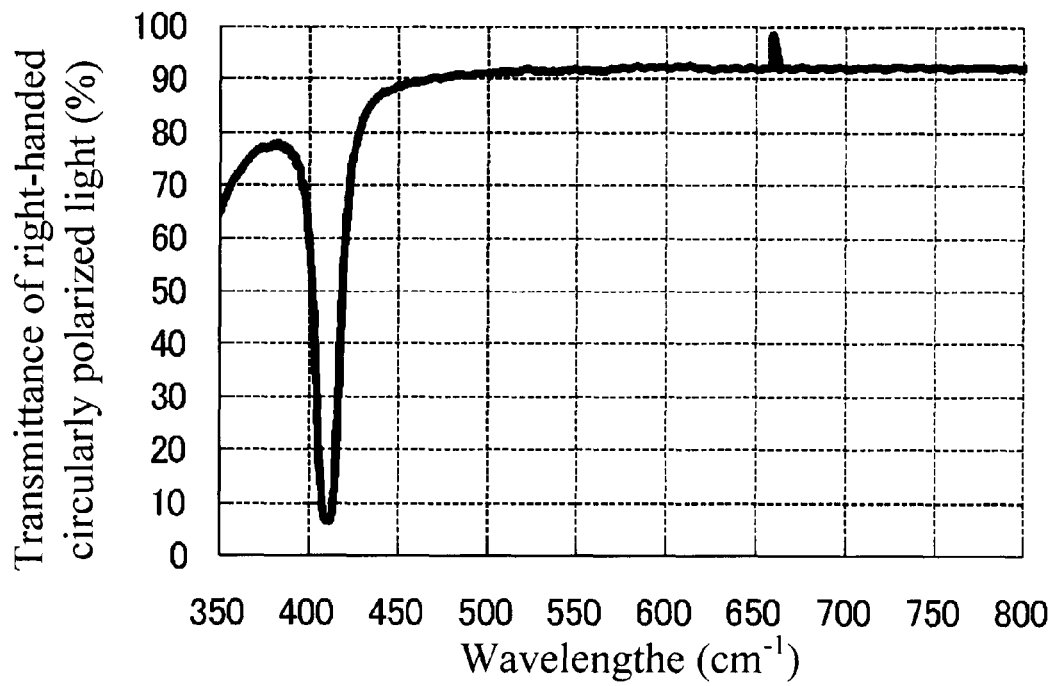
FIG. 10 is the transmittance spectrum in right-handed circularly polarized light of the cured film L3 of the present invention.
Figure 11:
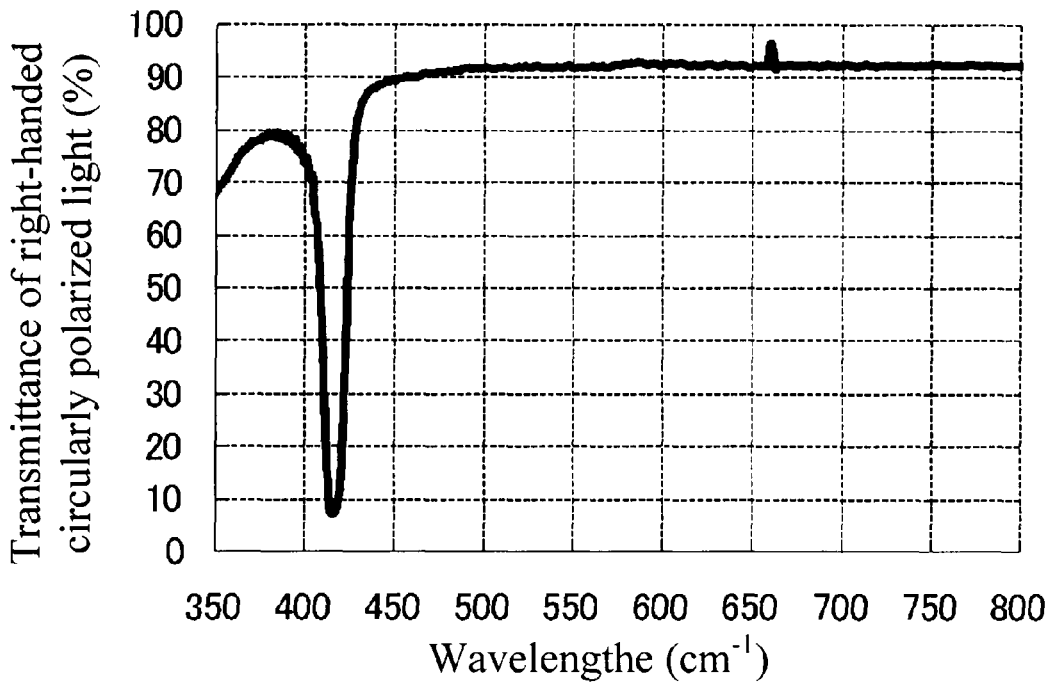
FIG. 11 is the transmittance spectrum in right-handed circularly polarized light of the cured film M3 of the present invention.

FIG. 7 shows an IR spectrum of the diacrylate compound (1A-1-4). Moreover, the values of $T_m$ and $T_c$ and $^1$HNMR spectrum are shown below.

$T_m$: 66.6° C., $T_c$: 86.2° C. (under descending temperature)

$^1$HNMR (400 MHz, solvent: $CDCl_3$, internal standard: TMS) δ (ppm): 0.66-1.99 (m, 32H), 2.30 (t, 4H), 4.16 (t, 4H), 4.64 (m, 1H), 4.72 (m, 1H), 5.81 (d, 2H), 6.00 (dd, 2H), 6.40 (d, 2H).

Example 3

Using the compound (14) obtained in Example 1, a liquid crystalline diacrylate compound (1A-2-3) was synthesized as follows.

Step 2-1

First, using the compound (14), a compound (17) was synthesized according to the following reaction equation.

[Chem 11]

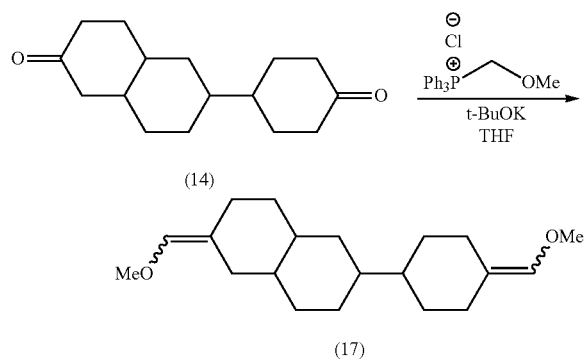

(14)

(17)

To a 500 mL four-neck flask were added 27.8 g (81.1 mmol) of (methoxymethyl)triphenylphosphonium chloride and 100 mL of THF. While ice cooling under a nitrogen atmosphere, 11.8 g (105.2 mmol) of potassium tert-butoxide dissolved in 100 mL of THF and 9.0 g (36.2 mmol) of the above-obtained compound (14) dissolved in 60 mL of THF were added thereto, followed by stirring at 20° C. for 4 hours. Thereafter, water was added to terminate the reaction and the solvent was removed under reduced pressure, and then the mixture was extracted with hexane. After the organic phase was filtrated to remove insoluble solid, the filtrate was washed with saturated saline and dried over anhydrous sodium sulfate and then the solvent was removed under reduced pressure to obtain an unpurified compound (14). This was purified by column chromatography using hexane/ethyl acetate (4:1, volume ratio) as a developing liquid to obtain 8.5 g of the compound (17). The yield was 77%.

Step 2-2

Next, using the compound (17), a compound (18) was synthesized according to the following reaction equation.

[Chem 12]

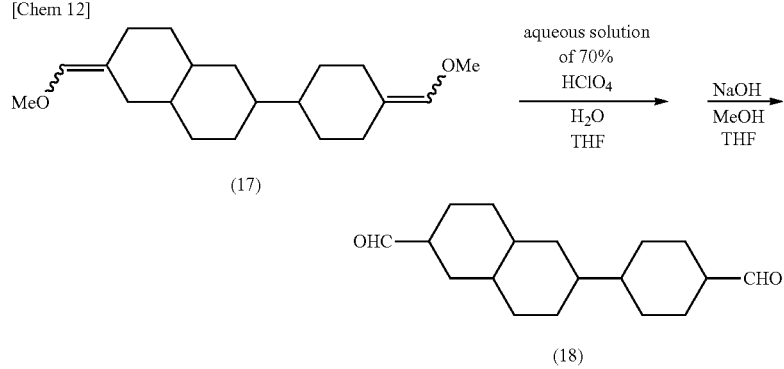

(17)

(18)

To a 300 mL eggplant-shaped flask were added 8.5 g (27.9 mmol) of the compound (17) obtained in the above, 50 mL of THF, 50 mL of water, and 12.0 g (83.6 mmol) of a 70% aqueous perchloric acid solution, followed by stirring at 50° C. for 18 hours. After saturated saline was added, the mixture was extracted with ethyl acetate and the organic phase was washed with a saturated aqueous solution of sodium bicarbonate and dried over anhydrous sodium sulfate. Then, the solvent was removed under reduced pressure to obtain an unpurified compound. This was added to a 300 mL eggplant-shaped flask, and 70 mL of THF, 35 mL of methanol, and 20 mL of a 10% aqueous sodium hydroxide solution were added thereto, followed by stirring at 0° C. for 2 hours. After reaction was completed, when hexane was added, a solid was precipitated. By filtrating it, 4.3 g of the compound (18) was obtained. The yield was 56%.

Step 2-3

Next, using the compound (18), a compound (19) was synthesized according to the following reaction equation.

[Chem 13]

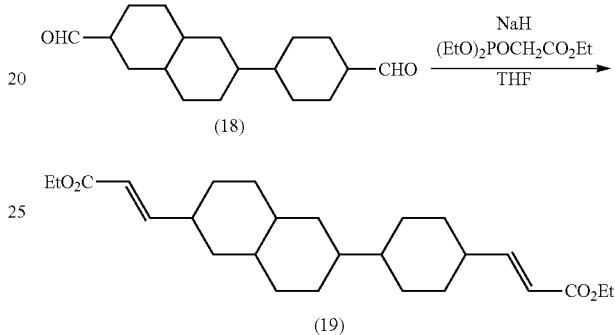

(18)

(19)

To a 500 mL four-neck flask were added 2.0 g (40.8 mmol) of sodium hydride and 50 mL of THF. While ice cooling under a nitrogen stream, 7.6 mL (37.7 mmol) of ethyl diethylphosphonoacetate was added thereto, followed by stirring at 20° C. for 10 minutes. This was again ice-cooled and 4.3 g (15.7 mmol) of the compound (18) dissolved in 100 mL of THF was added thereto, followed by stirring at 20° C. for 3 hours. Thereafter, water was added to terminate the reaction and the solvent was removed under reduced pressure, and then 1N hydrochloric acid was added and the mixture was extracted with ethyl acetate. After the organic phase was washed with saturated saline and dried over anhydrous sodium sulfate, the solvent was removed under reduced pressure to obtain an unpurified compound (19). This was purified by column chromatography using hexane/ethyl acetate (4:1, volume ratio) as a developing liquid to obtain 2.9 g of the compound (19). The yield was 43%.

Step 2-4

Next, using the compound (19), a compound (20) was synthesized according to the following reaction equation.

[Chem 14]

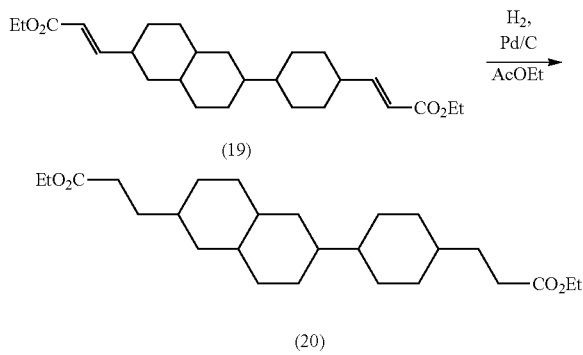

To a 300 mL eggplant-shaped flask were added 2.9 g (6.8 mmol) of the above-obtained compound (19), 100 mL of ethyl acetate, and 0.1 g of 10% palladium-active carbon (Pd/C) as a catalyst. Hydrogen was introduced thereto using a rubber balloon, followed by stirring at 20° C. for 12 hours. After reaction was completed, the mixture was filtrated through silica gel to remove the palladium catalyst and then the filtrate was concentrated to obtain the compound (20).

Step 2-5

Next, using the compound (20), a compound (21) was synthesized according to the following reaction equation.

[Chem 15]

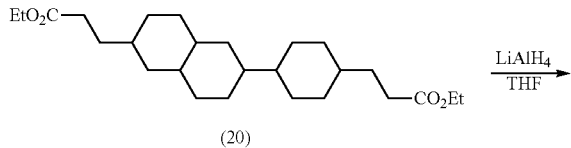

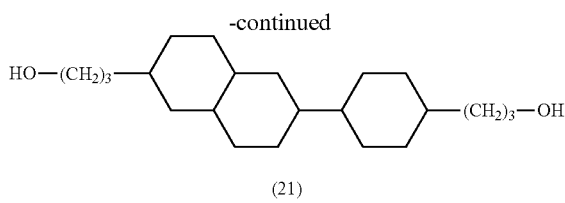

To a 300 mL eggplant-shaped flask were added 0.6 g (16.3 mmol) of lithium aluminum hydride and 50 mL of THF. While ice cooling, the above-obtained compound (20) was dissolved in 25 mL of THF and was added thereto. After stirring at 20° C. for 6 hours, ethyl acetate was added to terminate the reaction while ice cooling. And then, 0.6 mL of water, 0.6 mL of a 15% aqueous solution of sodium hydroxide, and 1.8 mL of water were added thereto sequentially while stirring. Thereafter, insoluble matter of aluminum was removed by filtration and the filtrate was concentrated to obtain the compound (21).

Step 2-6

Next, using the compound (21), a compound (1A-2-3) was synthesized according to the following reaction equation.

[Chem 16]

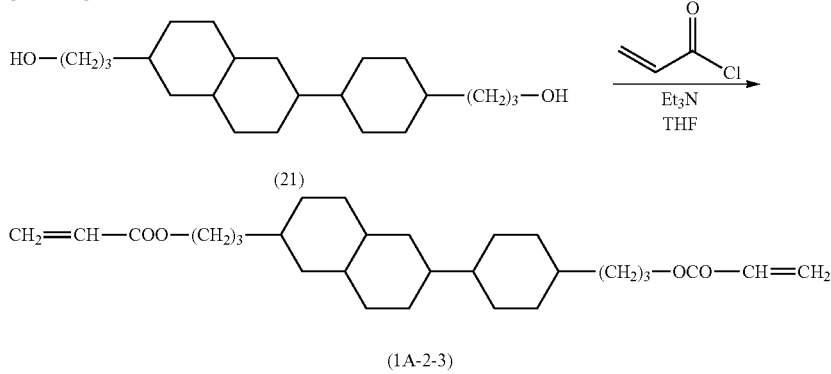

To a 300 mL four-neck flask were added the above-obtained compound (21), 2.7 mL (19.0 mmol) of triethylamine, and 75 mL of THF. Under a nitrogen stream, while ice cooling so that inner temperature did not exceed 20° C., 1.3 mL (16.3 mmol) of acryloyl chloride was added dropwise and the mixture was stirred for 3 hours. After reaction was completed, THF and acryloyl chloride were removed under reduced pressure, and the residue was purified by column chromatography using dichloromethane/hexane (4:1, volume ratio) as a developing liquid. Then, recrystallization was further performed from dichloromethane/hexane to obtain 1.4 g of a liquid crystalline diacrylate compound (1A-2-3). The yield was 48% through 3 steps of Step (2-4), Step (2-5), and Step (2-6).

Figure 6:
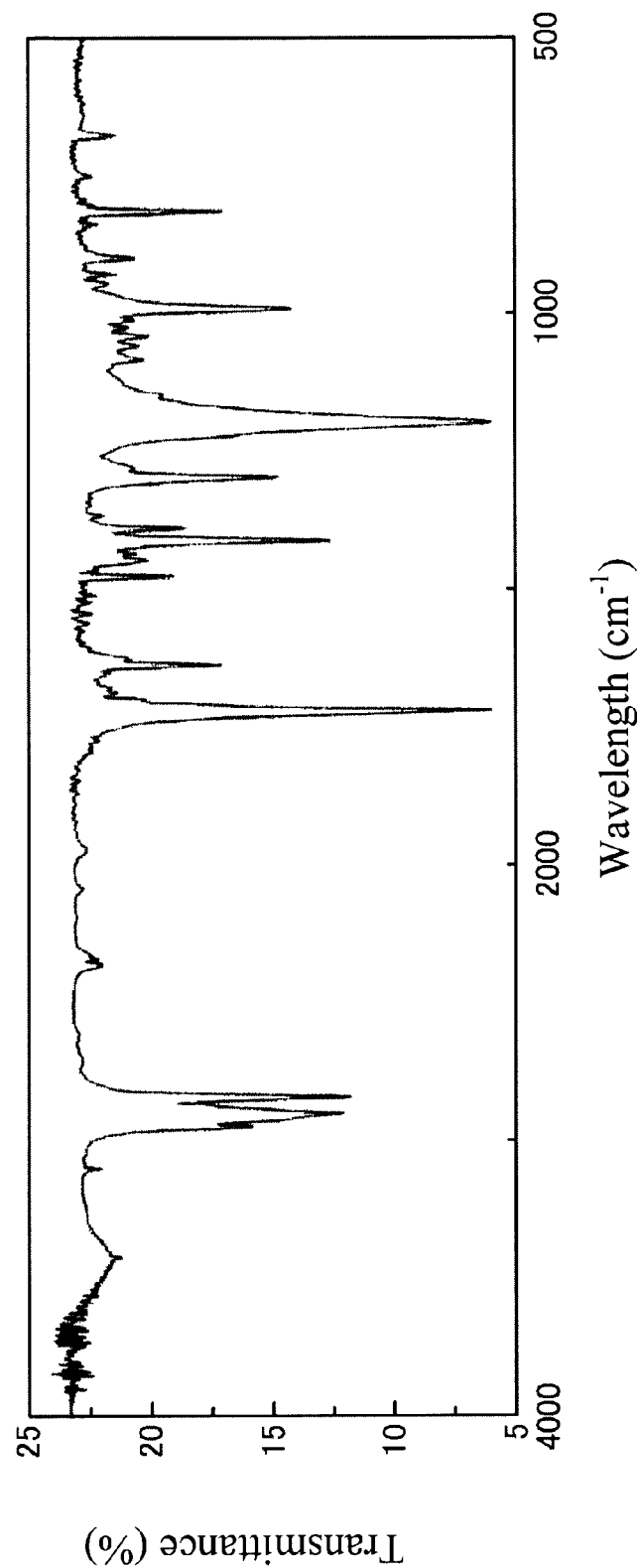
FIG. 6 is a view showing the IR spectrum of compound (1A-2-3) of the present invention.

FIG. 6 shows an IR spectrum of the liquid crystalline diacrylate compound (1A-2-3). Moreover, the values of $T_m$ and $T_c$ and $^1$HNMR spectrum are shown below.

$T_m$: 55° C., $T_c$: 71° C. (under descending temperature)

$^1$HNMR (400 MHz, solvent: $CDCl_3$, internal standard: TMS) δ (ppm): 0.60-1.77 (m, 34H), 4.13 (t, 4H), 5.80 (d, 2H), 6.11 (dd, 2H), 6.39 (d, 2H).

Preparation of Polymerizable Liquid Crystalline Composition

Examples 4 to 13

Using the liquid crystalline diacrylate compounds (1A-1-3), (1A-1-4) and the liquid crystalline diacrylate compound (1A-2-3) obtained in Examples 1 to 3 and, as liquid crystalline compounds other than them, the following compound (3-1a), compound (3-1b), compound (4-1a), compound (4-1b), compound (4-2b), compound (4-3a), compound (4-4-a), and compound (4-4-b), they were mixed at the ratios shown in Table 1 to obtain polymerizable liquid crystalline compositions A to J according to the present invention as Examples 4 to 13. Here, each numerical value described in Table 1 shows a ratio of each liquid crystalline compound constituting the polymerizable liquid crystalline compositions A to J and thus is a ratio (% by mol) of each liquid crystalline compound constituting the polymerizable liquid crystalline compositions. Furthermore, Table 1 also shows the values of $T_m$ and $T_c$ of each of the polymerizable liquid crystalline compositions A to J.

[Chem 17]

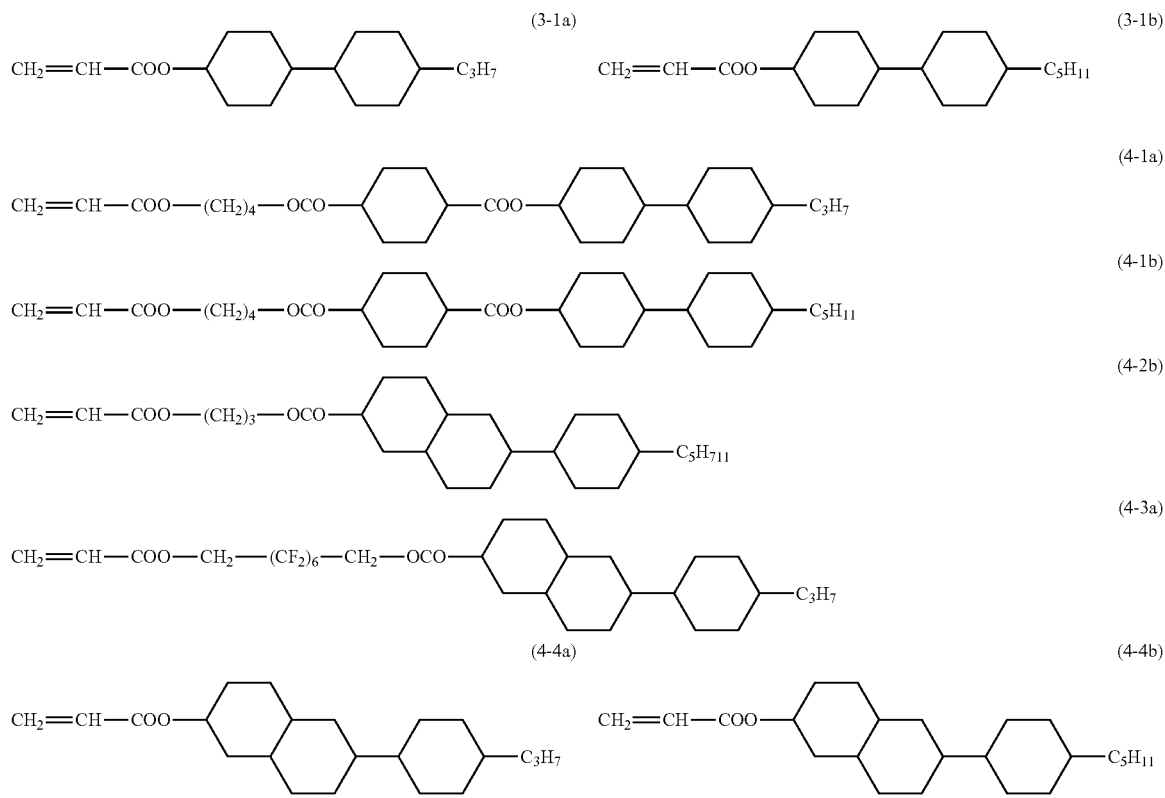

TABLE 1

| Example | | 4 | 5 | 6 | 7 | 8 | 9 | 10 | 11 | 12 | 13 |
|---|---|---|---|---|---|---|---|---|---|---|---|
| Composition | | A | B | C | D | E | F | G | H | I | J |
| Compound | (1A-1-3) | 30 | 60 | 80 | — | 40 | 40 | 40 | — | 40 | 30 |
| | (1A-1-4) | — | — | — | — | — | — | — | 40 | — | — |
| | (1A-2-3) | — | — | — | 60 | — | — | — | — | — | — |
| | (3-1a) | — | — | — | — | 22.5 | — | — | — | — | — |
| | (3-2b) | — | — | — | — | 22.5 | — | — | — | — | — |
| | (4-1a) | — | — | — | — | 7.5 | — | — | — | 7.5 | 12.5 |
| | (4-1b) | — | — | — | — | 7.5 | — | — | — | 7.5 | 12.5 |
| | (4-2b) | 70 | 40 | 20 | 40 | — | — | 15 | 15 | — | — |
| | (4-3a) | — | — | — | — | — | 40 | — | — | — | — |
| | (4-4a) | — | — | — | — | — | 20 | 22.5 | 22.5 | 22.5 | 22.5 |
| | (4-4b) | — | — | — | — | — | — | 22.5 | 22.5 | 22.5 | 22.5 |
| Tm*[1] | | 35° C. or lower | 35° C. or lower | 35° C. or lower | 35° C. or lower | 35° C. or lower | 30° C. or lower | 30° C. or lower | 38° C. | 30° C. or lower | 30° C. or lower |
| Tc*[1] | | 90° C. | 79° C. | 71° C. | 81° C. | 85° C. | 72° C. | 98° C. | 106° C. | 108° C. | 118° C. |

*[1] Tm and Tc are phase transition points under descending temperature

The polymerizable liquid crystalline compositions A to J that are examples of the present invention all showed a wide and stable liquid phase in a temperature range easy to handle.

Preparation of Optical Element

Examples 14 to 23

On a glass substrate having a length of 5 cm, a width of 5 cm, and a thickness of 0.5 mm, a polyimide solution was applied by a spin coater and, after drying, subjected to a rubbing treatment in one direction by a nylon cloth to prepare a supporting member. Then, two such supporting members were laminated with an adhesive agent so that faces of the supporting members subjected to the alignment treatment faced to each other, to prepare a cell. To the adhesive agent, glass beads having a diameter of 4.5 μm were added in advance so that the distance between the supporting members became 5 μm.

Next, to the polymerizable liquid crystalline compositions A to J prepared in Examples 4 to 13, a polymerization initiator was added in each ratio shown in Table 2 based on each polymerizable liquid crystalline composition to obtain polymerizable liquid crystalline compositions A1 to J1. Here, as the photopolymerization initiator, "IRGACURE 754" (product name) manufactured by Ciba Specialty Chemicals K.K. was employed. As Examples 14 to 23 of the present invention, optical elements according to the present invention were prepared. In table 2, preparation conditions of the optical elements that are Examples 14 to 23 of the present invention and the like are summarized.

As shown in Table 2, in Examples 14 to 16, 19, and 20, into the cell, the polymerizable liquid crystalline compositions A1 to C1, F1, and G1 were each injected at a temperature of 90° C. and, even though they were allowed to stand at each polymerization temperature shown in Table 2 for 30 minutes, no precipitation of crystals was observed and stable liquid crystal phases were maintained. Subsequently, under each polymerization temperature condition shown in Table 2, irradiation with UV rays having an intensity of 50 mW/cm² were performed so that the integrated light amount became 9,000 mJ/cm² or irradiation with UV rays having an intensity of 130 mW/cm² were performed so that the integrated light amount became 23,400 mJ/cm² to carry out photopolymerization to obtain optical elements A to C, F, and G corresponding to Examples 14 to 16, 19, and 20, respectively.

Moreover, the polymerizable liquid crystalline compositions D1 to E1 and H1 to J1 were each injected into a wedge cell at a temperature of 90° C. and, under each polymerization temperature condition shown in Table 2, irradiation with UV rays having an intensity of 50 mW/cm² were performed so that the integrated light amount became 9,000 mJ/cm² or irradiation with UV rays having an intensity of 130 mW/cm² were performed so that the integrated light amount became 23,400 mJ/cm² to carry out photopolymerization to obtain wedge cells D, E, and H to J corresponding to Examples 17, 18, and 21 to 23, respectively.

In the optical elements A to C, F, and G, liquid crystals were all horizontally aligned in the rubbing direction of the substrates. Moreover, the optical elements A to C, F, and G were all transparent in the visible region, and no scattering was observed. Furthermore, the values of Δn for a laser beam having a wavelength of 405 nm were 0.0423, 0.0409, 0.0364, 0.0411, and 0.0327, respectively.

The values of Δn of the wedge cells D, E, and H to J for a laser beam having a wavelength of 405 nm were 0.0334, 0.0364, 0.0327, 0.0391, and 0.0430, respectively. The results are shown in Table 2.

TABLE 2

| Example | 14 | 15 | 16 | 17 | 18 | 19 | 20 | 21 | 22 | 23 |
|---|---|---|---|---|---|---|---|---|---|---|
| Composition | A1 | B1 | C1 | D1 | E1 | F1 | G1 | H1 | I1 | J1 |
| Optical element | A | B | C | — | — | F | G | — | — | — |
| Preparation of optical element | | | | | | | | | | |
| Cell gap (μm) | 5.0 | 5.0 | 5.0 | — | — | 5.0 | 5.0 | — | — | — |
| Photopolymerization initiator | 0.1 | 0.1 | 0.1 | 0.1 | 0.1 | 0.1 | 0.5 | 0.5 | 0.5 | 0.5 |
| Injection temperature (° C.) | 90 | 90 | 90 | 90 | 90 | 90 | 90 | 90 | 90 | 90 |
| Appearance after injection | | | | | stable liquid crystal phase | | | | | |
| Polymerization temperature (° C.) | 45 | 35 | 60 | 50 | 50 | 60 | 35 | 50 | 35 | 35 |
| UV intensity (mW/cm²) | 50 | 50 | 50 | 50 | 50 | 130 | 130 | 130 | 130 | 130 |
| Integrated light amount (mJ/cm²) | 9000 | 9000 | 9000 | 9000 | 9000 | 23400 | 23400 | 23400 | 23400 | 23400 |
| Evaluation of optical element | | | | | | | | | | |
| Transparency | | transparent | | — | — | transparent | | — | — | — |
| Alignment of liquid crystal | | horizontal alignment | | — | — | horizontal alignment | | — | — | — |
| Δn (λ = 405 nm) | 0.0423 | 0.0409 | 0.0364 | 0.0334*[3] | 0.0364*[3] | 0.0411 | 0.0327 | 0.0327*[3] | 0.0391*[3] | 0.0430*[3] |

*[3] measured in a wedge cell

Cholesteric Physical Properties

Example 24

Preparation of Cholesteric Liquid Crystalline Composition and Polymerization

A polymerizable chiral dopant (7-1) shown below was added to each of the compositions G1 to J1 in Examples 20 to 23 in the amount (% by mass) shown in Table 3 to obtain each of cholesteric liquid crystalline compositions G2 to J2. On this occasion, liquid crystal temperature width where each of the compositions showed a chlolesteric phase was as follows:

G2: 37.3° C. or more (room-temperature liquid crystal), H2: 39.1° C., I2: 42.0° C. or more (room-temperature liquid crystal), J2: 47.3° C. Thus, it could be confirmed to have a wide liquid crystal temperature width.

[Chem 18]

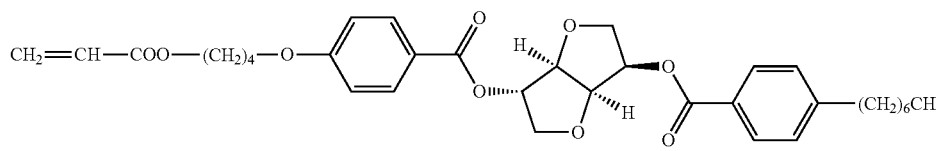

(7-1)

Furthermore, the cholesteric liquid crystalline compositions G2 to J2 were polymerized by the method shown in Table 3. However, as a cell to be used in the polymerization, one having a film thickness of 15 μm was used. Thereby, cured films G3 to J3 that are polymers of cholesteric liquid crystalline compositions were obtained.

TABLE 3

| Composition | G2 | H2 | I2 | J2 |
|---|---|---|---|---|
| Preparation of optical element | | | | |
| Cell gap (μm) | 15 μm | | | |
| Amount of chiral (7-1) added | 9.8% by mass | 10.9% by mass | 11.3% by mass | 13.0% by mass |
| Tm*[1] | 30° C. or lower | 33° C. | 30° C. or lower | 30° C. or lower |
| Tc*[1] | 69° C. | 72° C. | 72° C. | 76° C. |
| Injection temperature (° C.) | 90 | | | |
| Appearance after injection | stable cholesteric phase | | | |
| Polymerization temperature (° C.) | 35 | 55 | 35 | 35 |
| UV intensity (mW/cm$^2$) | 130 | 130 | 130 | 130 |
| Integrated light amount (mJ/cm$^2$) | 23400 | 23400 | 23400 | 23400 |
| Evaluation of optical element | | | | |
| Transparency | transparent | | | |
| Shape of selective reflection band | good rectangular | | | |

*[1]phase transition points under descending temperature

In Table 3, the amount of the chiral dopant (7-1) added is adjusted in advance so that central wavelength of the selective reflection band of each of the cured films G3 to J3 becomes about 405 nm. This is because, for example, a particular optical element which, "while having light stability at a wavelength of 405 nm, transmits a left-handed circularly polarized light/reflects a right-handed circularly polarized light at this wavelength and transmits left and right-handed circularly polarized lights at a wavelength of 660 nm and at a wavelength of 785 nm" can be prepared. In the present Examples, these cured films G3 to J3 all reflect a right-handed circularly polarized light.

Properties of Cured Film of Cholesteric Liquid Crystal Composition

FIG. 8 to FIG. 11 are spectra of light transmittance in a certain wavelength range of the cured films G3 to J3, respectively. However, among individual spectra, spectra each having a large selective reflection band downward are attributable to a right-handed circularly polarized light. From these figures, it is understood that the compositions are polymerized in a state that the selective reflection band is well maintained.

Here, the measurement of the spectrum of the light transmittance is performed by passing a non-polarized light emitted from a light source through a polarizer set ahead of the light source to take out linearly polarized light, applying the linearly polarized light to a λ/4 wavelength plate at a prescribed angle to transform the light into polarized light (right-handed circularly polarized light or left-handed circularly polarized light), transmitting the polarized light through a sample, and measuring the resulting transmitted light on a spectrometer.

Evaluation of Optical Element

Example 25

Irradiation with Kr laser beam (multimode of wavelengths of 407 nm and 413 nm) was performed onto the optical elements A to C and G that are Examples of the present invention, obtained in Examples 14 to 16 and 20, to carry out a blue laser beam exposure acceleration test. The irradiation conditions were such that the temperature was 80° C. and the integrated exposure energies were 30 W·hr/mm$^2$. The decrease of Δn after the acceleration test relative to Δn before the acceleration test was less than 1% in all cases. Moreover, when aberration of the exposed site was measured after the acceleration test, difference between the maximum value and the minimum value of the aberration of the exposed site is less than 10 mλ in all cases. Here, λ corresponds the wavelength of 405 nm of the measuring light. From the above results, it was confirmed that the optical elements A to C and G are all excellent in durability against a blue laser light. Moreover, also as compared with the cases of Comparative Examples of the present invention to be explained below, it was understood that the durability against a blue laser light is very excellent.

Preparation of Polymerizable Liquid Crystalline Composition

Comparative Examples 1 and 2

Using aforementioned compound (3-1a), compound (3-1b), compounds (4-1a) and (4-1b), and the following compounds (5-1) and (5-2), they are mixed in the ratios shown in Table 4 to obtain a polymerizable liquid crystalline composition K and a polymerizable liquid crystalline composition L that are Comparative Examples of the present invention. Here, each numerical value described in Table 4 shows a ratio of individual compound constituting the polymerizable liquid crystalline compositions K and L and thus is a ratio (% by mol) of each compound constituting the polymerizable liquid crystalline compositions. Moreover, in Table 4, the values of $T_m$ and $T_c$ of the polymerizable liquid crystalline compositions K and L are also shown.

[Chem 19]

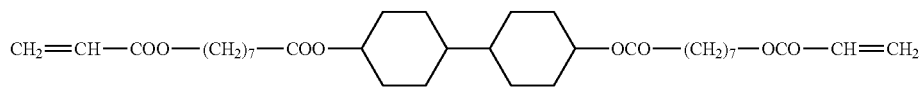
(5-1)

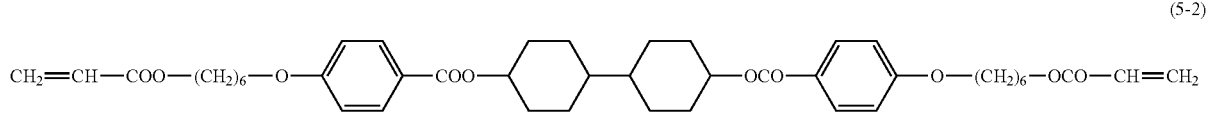
(5-2)

TABLE 4

| Comparative Example | 1 | 2 |
|---|---|---|
| Composition | K | L |
| Compound (3-1a) | 22.5 | 22.5 |
| Compound (3-2b) | 22.5 | 22.5 |
| Compound (4-1a) | 7.5 | 7.5 |
| Compound (4-1b) | 7.5 | 7.5 |
| Compound (5-1) | 40 | — |
| Compound (5-2) | — | 40 |
| Tm*[1] | 80° C.*[2] | 95° C. |
| Tc*[1] | —*[2] | 177° C. |

*[1]Tm and Tc are phase transition points under descending temperature
*[2]The polymerizable liquid crystalline composition K did not exhibit liquid crystallinity.

The polymerizable liquid crystalline composition L exhibited a nematic liquid crystal phase, but the polymerizable liquid crystalline composition K did not exhibit a nematic liquid crystal phase and thus an optical element was not prepared.

Comparative Example 3

The following compounds (6-1a) and (6-1b) were mixed in a ratio of 1:1 (molar ratio) to prepare a polymerizable liquid crystalline composition M. The polymerizable liquid crystalline composition M exhibited a nematic liquid crystal phase.

$CH_2$=CH—COO-Ph-OCO-Cy-$C_3H_7$ (6-1a)

$CH_2$=CH—COO-Ph-OCO-Cy-$C_5H_{11}$ (6-1b)

Comparative Example 4

Using liquid crystalline compounds (6-1a), (6-1b), (3-1a), and (3-1b), they are mixed in a ratio of 1:1:1:1 (molar ratio) to prepare a polymerizable liquid crystalline composition N. The polymerizable liquid crystalline composition N exhibited a nematic liquid crystal phase.

Comparative Example 5

Using aforementioned compound (4-1a), compound (4-1b), compound (4-4-a), compounds (4-4-b), and compound (5-1), they are mixed in a ratio of 7.5:7.5:22.5:22.5:40 (molar ratio) to prepare a polymerizable liquid crystalline composition O that is Comparative Example of the present invention. The polymerizable liquid crystalline composition O exhibited a nematic liquid crystal phase and showed $T_m$: 40° C. and $T_c$: 83° C. (phase transition points under descending temperature).

Preparation of Optical Element

Comparative Examples 6 to 8

To the polymerizable liquid crystalline compositions L to N prepared in Comparative Examples 2 to 4, a polymerization initiator was added in a ratio of 0.05 to 0.2% by mass based on each of the polymerizable liquid crystalline compositions L to N as shown in Table 5 to obtain polymerizable liquid crystalline compositions L1 to N1. Here, as the photopolymerization initiator, "IRGACURE 754" (product name) manufactured by Ciba Specialty Chemicals K.K. was employed for L and "IRGACURE 907" (product name) manufactured by Ciba Specialty Chemicals K.K. was employed for M and N. In Table 5, preparation conditions of the optical elements that are Comparative Examples 6 to 8 of the present invention and the like are summarized.

Into a cell prepared in the same manner as in aforementioned Example 8, the above-described polymerizable liquid crystalline compositions L1 to N1 were each injected under the conditions shown in Table 5, allowed to stand at each polymerization temperature for 30 minutes, and irradiated with UV rays under the conditions shown in Table 5 to carry out photopolymerization to obtain optical elements L to N corresponding to Comparative Examples 6 to 8, as Comparative Examples of the present invention.

In the preparation of the optical element L, the injection temperature and polymerization temperature were very high, thus handling was extremely difficult, and further, regions where thermal polymerization took place were partially observed.

TABLE 5

| Comparative Example | 6 | 7 | 8 |
|---|---|---|---|
| Composition | L1 | M1 | N1 |
| Optical element | L | M | N |
| Preparation of optical element | | | |
| Cell gap (μm) | 2.5 | 5.0 | 5.0 |
| Photopolymerization initiator | 0.05 | 0.2 | 0.2 |
| Injection temperature (° C.) | 135 | 70 | 70 |
| Appearance after injection | partially thermal polymerization | stable liquid crystal phase | stable liquid crystal phase |
| Polymerization temperature (° C.) | 125 | 30 | 30 |
| UV intensity (mW/cm$^2$) | 50 | 80 | 80 |
| Integrated light amount (mJ/cm$^2$) | 9000 | 5300 | 5300 |
| Evaluation of optical element | | | |
| Transparency | partially thermal polymerization | transparent | transparent |
| Alignment of liquid crystal | horizontal alignment | horizontal alignment | horizontal alignment |
| Δn (λ = 405 nm) | 0.0799 | 0.0352 | 0.0403 |

Comparative Example 9

To the polymerizable liquid crystalline composition O prepared in Comparative Example 5, a polymerization initiator was added in a ratio of 0.5% by mass to obtain a polymerizable liquid crystalline composition O1. Here, as the photopolymerization initiator, "IRGACURE 754" (product name) manufactured by Ciba Specialty Chemicals K.K. was employed.

Preparation of Cholesteric Liquid Crystal Composition and Polymerization

When the amount of the chiral dopant (7-1) to be added to the composition O1 was sequentially increased so that the central wavelength of the selective reflection band became 405 nm as in Example 25, the liquid crystal temperature width was dramatically narrowed in the vicinity of a wavelength λ of about 440 nm (chiral dopant: 12.2%) and it became difficult to maintain a cholesteric phase solely in a descending temperature state. As a result, the composition reached a crystallization point (Tm) in a mixed state of an isotropic phase and a cholesteric phase. Since this results the disappearance of the selective reflection band in the cured product, a cured product having a selective reflection band in a band region of a wavelength of 405 nm as shown in FIG. 8 to FIG. 11 could not be obtained. This is because the liquid crystal temperature width is narrowed owing to the use of not the compound (1A-1-3) or (1A-1-4) according to the present invention but the compound (5-1).

Evaluation of Optical Element

Comparative Example 10

Irradiation with Kr laser beam (multimode of wavelengths of 407 nm and 413 nm) was performed onto the optical elements M and N obtained in Comparative Examples 7 and 8 to carry out a blue laser beam exposure acceleration test. The irradiation conditions were such that the temperature was 80° C. and the integrated exposure energies were 15 W·hr/mm². With regard to the optical element M, when aberration of the exposed site was measured after the acceleration test, difference between the maximum value and the minimum value of the aberration of the exposed site is 300 mλ or more. Here, λ corresponds the wavelength of 405 nm of the measuring light. Also, with regard to the optical element N, when aberration of the exposed site was measured after the acceleration test, difference between the maximum value and the minimum value of the aberration of the exposed site is 100 mλ or more. Here, λ corresponds the wavelength of 405 nm of the measuring light.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2009-161367 filed on Jul. 8, 2009 and Japanese Patent Application No. 2010-146738 filed on Jun. 28, 2010, and these contents are incorporated herein by reference.

INDUSTRIAL APPLICABILITY

The optical anisotropic material obtained by polymerizing the polymerizable liquid crystalline composition containing the compound according to the present invention well satisfies properties required for common optical anisotropic materials and also is excellent in light stability against a blue laser beam. Therefore, the optical element prepared by utilizing the diacrylate compound according to the present invention may be effectively used not only as an optical pick-up element, an imaging element, and an optical element and the like to be utilized in communication devices which hitherto exist but also as a diffraction element for modulating a blue laser beam and a material for retardation plates and the like.

DESCRIPTION OF REFERENCE NUMERALS AND SIGNS

1: Light source
2: Beam splitter
3: Collimator lens
4: Retardation plate
5: Objective lens
6: Optical disk
7: Photodetector

The invention claimed is:

1. A di(meth)acrylate compound represented by the following formula (1):

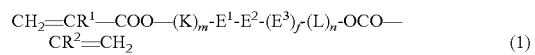

$$CH_2=CR^1-COO-(K)_m-E^1-E^2-(E^3)_f-(L)_n-OCO-CR^2=CH_2 \qquad (1)$$

wherein $R^1$ and $R^2$ are each independently a hydrogen atom or a methyl group, m and n are each independently 0 or 1, K is $-(CH_2)_pCOO-$, $-(CH_2)_pOCO-$, $-(CH_2)_pO-$, or $-(CH_2)_p-$ (where each p is independently an integer of 1 to 8), wherein an ethereal oxygen atom may be present in a carbon to carbon bond and some or all of hydrogen atoms may be each substituted by a fluorine atom, L is $-OCO(CH_2)_q-$, $-COO(CH_2)_q-$, $-O(CH_2)_q-$, or $-(CH_2)_q-$ (where each q is independently an integer of 1 to 8), wherein an ethereal oxygen atom may be present in a carbon to carbon bond and some or all of hydrogen atoms may be each substituted by a fluorine atom, $E^1$ is a trans-2,6-decahydronaphthalene group and $E^2$ is a trans-1,4-cyclohexylene group (where, in the trans-1,4-cyclohexylene group in $E^2$ and trans-2,6-decahydronaphthalene group in $E^1$, some or all of hydrogen atoms bonded to carbon atoms in these groups may be each substituted by a fluorine atom or a methyl group), $E^3$ is a trans-1,4-cyclohexylene group or a 1,4-phenylene group (where, in the trans-1,4-cyclohexylene group and 1,4-phenylene group in $E^3$, some or all of hydrogen atoms bonded to carbon atoms in these groups may be each substituted by a fluorine atom or a methyl group), and f is 0 or 1.

2. The di(meth)acrylate compound according to claim 1, wherein, in the formula (1), K is $-(CH_2)_pCOO-$ or $-(CH_2)_p-$ (where each p is independently an integer of 1 to 8), an ethereal oxygen atom may be present in a carbon to carbon bond, and some or all of hydrogen atoms may be each substituted by a fluorine atom.

3. The di(meth)acrylate compound according to claim 1, wherein, in the formula (1), f is 0.

4. A polymerizable liquid crystalline composition, which contains a di(meth)acrylate compound represented by the following formula (1):

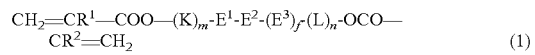

$$CH_2=CR^1-COO-(K)_m-E^1-E^2-(E^3)_f-(L)_n-OCO-CR^2=CH_2 \qquad (1)$$

wherein $R^1$ and $R^2$ are each independently a hydrogen atom or a methyl group, m and n are each independently 0 or 1, K is —(CH$_2$)$_p$COO—, —(CH$_2$)$_p$OCO—, —(CH$_2$)$_p$O—, or —(CH$_2$)$_p$— (where each p is independently an integer of 1 to 8), wherein an ethereal oxygen atom may be present in a carbon to carbon bond and some or all of hydrogen atoms may be each substituted by a fluorine atom, L is —OCO(CH$_2$)$_q$, —COO(CH$_2$)$_q$—, —O(CH$_2$)$_q$—, or —(CH$_2$)$_q$— (where each q is independently an integer of 1 to 8), wherein an ethereal oxygen atom may be present in a carbon to carbon bond and some or all of hydrogen atoms may be each substituted by a fluorine atom, E$^1$ and E$^2$ are each independently a trans-1,4-cyclohexylene group or a trans-2,6-decahydronaphthalene group and either one of E$^1$ and E$^2$ is a trans-2,6-decahydronaphthalene group (where, in the trans-1,4-cyclohexylene group and trans-2,6-decahydronaphthalene group in E$^1$ and E$^2$, some or all of hydrogen atoms bonded to carbon atoms in these groups may be each substituted by a fluorine atom or a methyl group), E$^3$ is a trans-1,4-cyclohexylene group or a 1,4-phenylene group (where, in the trans-1,4-cyclohexylene group and 1,4-phenylene group in E$^3$, some or all of hydrogen atoms bonded to carbon atoms in these groups may be each substituted by a fluorine atom or a methyl group), and f is 0 or 1.

5. The polymerizable liquid crystalline composition according to claim 4, which is a polymerizable cholesteric liquid crystalline composition containing a polymerizable chiral material.

6. An optical anisotropic material comprising a polymer of the polymerizable liquid crystalline composition according to claim 4.

7. An optical element having the optical anisotropic material according to claim 6.

8. An optical information writing/reading device for writing information on an optical recording medium and/or reading information recorded on an optical recording medium, which has the optical element according to claim 7.

9. The di(meth)acrylate compound according to claim 1, wherein R$^1$ and R$^2$ are each hydrogen atoms.

10. The di(meth)acrylate compound according to claim 1, wherein K is —(CH$_2$)$_b$COO—.

11. The di(meth)acrylate compound according to claim 1, wherein L is —OCO(CH$_2$)$_q$— or (CH$_2$)$_q$.

12. The di(meth)acrylate compound according to claim 1, wherein L is —OCO(CH$_2$)$_q$—.

13. The di(meth)acrylate compound according to claim 1, wherein p and q are each independently an integer of 2 to 4.

14. The di(meth)acrylate compound according to claim 1, wherein none of the hydrogen atoms in K and L are substituted by a fluorine atom.

15. The di(meth)acrylate compound according to claim 1, wherein some of hydrogen atoms bonded to carbon atoms in E$^1$, E$^2$ and E$^3$ may be each substituted by a fluorine atom or a methyl group.

16. The di(meth)acrylate compound according to claim 1, wherein some or all of hydrogen atoms bonded to carbon atoms in E$^1$, E$^2$ and E$^3$ may be each substituted by a methyl group.

17. The di(meth)acrylate compound according to claim 1, wherein none of hydrogen atoms bonded to carbon atoms in E$^1$, E$^2$ and E$^3$ may be substituted.

* * * * *